(12) United States Patent
Xiong et al.

(10) Patent No.: US 12,373,405 B2
(45) Date of Patent: Jul. 29, 2025

(54) DATA MIGRATION METHOD AND APPARATUS, DEVICE, MEDIUM, AND COMPUTER PRODUCT

(71) Applicant: TENCENT TECHNOLOGY (SHENZHEN) COMPANY LIMITED, Shenzhen (CN)

(72) Inventors: Liangchun Xiong, Shenzhen (CN); Anqun Pan, Shenzhen (CN); Hailin Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 18/356,323

(22) Filed: Jul. 21, 2023

(65) Prior Publication Data

US 2023/0367749 A1    Nov. 16, 2023

Related U.S. Application Data

(63) Continuation of application No. PCT/CN2022/112395, filed on Aug. 15, 2022.

(30) Foreign Application Priority Data

Sep. 14, 2021   (CN) .......................... 202111076493.3

(51) Int. Cl.
  *G06F 16/00*   (2019.01)
  *G06F 16/21*   (2019.01)
  *G06F 16/23*   (2019.01)

(52) U.S. Cl.
  CPC ........ *G06F 16/214* (2019.01); *G06F 16/2379* (2019.01)

(58) Field of Classification Search
  CPC .......................... G06F 16/214; G06F 16/2379
  (Continued)

(56) References Cited

U.S. PATENT DOCUMENTS

2009/0122724 A1   5/2009   Rosenberg
2011/0282832 A1   11/2011  Rishel et al.
(Continued)

FOREIGN PATENT DOCUMENTS

CN   103354923 A   10/2013
CN   111563070 A   8/2020
(Continued)

OTHER PUBLICATIONS

The European Patent Office (EPO) The Extended European Search Report for Application No. 22868914.7 Jul. 18, 2024 7 Pages.
(Continued)

*Primary Examiner* — Chelcie L Daye
(74) *Attorney, Agent, or Firm* — ANOVA LAW GROUP, PLLC

(57) ABSTRACT

A data migration method includes: obtaining, by a first node, a first route assignment table; receiving, by the first node, a first instruction; obtaining, by the first node by using the first route assignment table, a first partition identity (ID) based on a first primary key ID carried in the first instruction; determining, by the first node, a second node based on the first partition ID; and transmitting, by the first node, first data uniquely identified by the first primary key ID to the second node.

18 Claims, 12 Drawing Sheets

(58) Field of Classification Search
USPC .......................................................... 707/703
See application file for complete search history.

(56) References Cited

U.S. PATENT DOCUMENTS

| | | |
|---|---|---|
| 2014/0351636 A1 | 11/2014 | Yin et al. |
| 2017/0012869 A1 | 1/2017 | Loher et al. |
| 2017/0359416 A1* | 12/2017 | Matsuda ............... G06F 3/0619 |
| 2018/0276252 A1 | 9/2018 | Zhang |
| 2019/0068536 A1* | 2/2019 | Gambino ................ H04L 67/10 |

FOREIGN PATENT DOCUMENTS

| | | | |
|---|---|---|---|
| CN | 112578997 A | 3/2021 | |
| CN | 113515364 A | 10/2021 | |

OTHER PUBLICATIONS

The World Intellectual Property Organization (WIPO) International Search Report for PCT/CN2022/112395 Nov. 15, 2022 13 Pages (including translation).

* cited by examiner

DATA MIGRATION METHOD AND APPARATUS, DEVICE, MEDIUM, AND COMPUTER PRODUCT

RELATED APPLICATION(S)

This application is a continuation application of PCT Patent Application No. PCT/CN2022/112395 filed on Aug. 15, 2022, which claims priority to Chinese Patent Application No. 202111076493.3, entitled "DATA MIGRATION METHOD AND APPARATUS, COMPUTER DEVICE, AND STORAGE MEDIUM" filed with the China National Intellectual Property Administration on Sep. 14, 2021, all of which are incorporated by reference in entirety.

FIELD OF THE TECHNOLOGY

The present disclosure relates to the field of Internet technologies and the field of traffic, and in particular, to data migration.

BACKGROUND

With development of Internet services, more and more programs provide services through the Internet. With growth of services, data migration may be implemented in a distributed cache system by using a Linux virtual server (LVS).

As a virtual layer-four switch cluster system, the LVS forwards a user request according to an address and a port, and performs data migration according to a connection processed by a current cluster database service process. Data migration may provide the distributed cache system with high scalability.

However, in a scenario in which a user transaction is complex, there is data interaction between a plurality of nodes, and efficiency of performing data migration by using the LVS is reduced to some extent. It may be desirable to improve the data migration efficiency in the scenario in which the user transaction is complex.

SUMMARY

Embodiments of the present disclosure provide a data migration method and apparatus, a device, a storage medium, and a computer product. In a scenario in which data interaction between a plurality of nodes is desired by a transaction, based on a mapping relationship between a primary key identity (ID) and a partition ID, data desired to be migrated can be determined by using the primary key ID, and a node to which the data is to be migrated can be determined by using the partition ID, thereby completing migration of the data between the plurality of nodes, without forwarding a user request for many times between the plurality of nodes. Therefore, data migration efficiency is improved.

A first aspect of the present disclosure provides a data migration method. The data migration method is applied to a load balancing system. The load balancing system includes a first node and a second node. The method includes: obtaining, by the first node, a first route assignment table, the first route assignment table including a mapping relationship between a first primary key ID and a first partition ID, the first primary key ID being used for uniquely identifying first data, and the first partition ID indicating the second node; receiving, by the first node, a first instruction, the first instruction carrying the first primary key ID and a first transaction ID, the first transaction ID indicating a first transaction, and the first node being configured to process the first transaction; obtaining, by the first node by using the first route assignment table, the first partition ID based on the first primary key ID carried in the first instruction; determining, by the first node, the second node based on the first partition ID, the second node being configured to process the first transaction; and transmitting, by the first node, the first data to the second node.

In certain embodiments of the method, in a scenario in which data interaction between a plurality of nodes is desired by a transaction, data desired to be migrated and a node to which the data is to be migrated are determined based on a mapping relationship between a primary key ID and a partition ID, and a user request is not desired to be forwarded for many times between the plurality of nodes. Therefore, data migration efficiency is improved.

A second aspect of the present disclosure provides a data migration apparatus, including: a memory storing computer program instructions; and a processor coupled to the memory and configured to execute the computer program instructions and perform: obtaining a first route assignment table, the first route assignment table including a mapping relationship between a first primary key identity (ID) and a first partition ID, the first primary key ID being used for uniquely identifying first data, and the first partition ID indicating a second node; receiving a first instruction, the first instruction carrying the first primary key ID and a first transaction ID, the first transaction ID indicating a first transaction, and a first node being configured to process the first transaction; obtaining the first partition ID based on the first primary key ID carried in the first instruction, by using the first route assignment table; determining the second node based on the first partition ID, the second node being configured to process the first transaction; and transmitting the first data to the second node.

A third aspect of the present disclosure provides a non-transitory computer-readable storage medium. The non-transitory computer-readable storage medium stores instructions which, when run in a computer, enable the computer to perform: obtaining a first route assignment table, the first route assignment table including a mapping relationship between a first primary key identity (ID) and a first partition ID, the first primary key ID being used for uniquely identifying first data, and the first partition ID indicating a second node; receiving a first instruction, the first instruction carrying the first primary key ID and a first transaction ID, the first transaction ID indicating a first transaction, and a first node being configured to process the first transaction; obtaining the first partition ID based on the first primary key ID carried in the first instruction, by using the first route assignment table; determining the second node based on the first partition ID, the second node being configured to process the first transaction; and transmitting the first data to the second node.

A fourth aspect of the present disclosure provides a computer program product or computer program. The computer program product or computer program includes computer instructions. The computer instructions are stored in a computer-readable storage medium. A processor of a computing device reads the computer instructions from the computer-readable storage medium. The processor executes the computer instructions to enable the computing device to perform the method provided in each of the aspects.

According to the technical solutions, it can be seen that the embodiments of the present disclosure have the following advantages.

The embodiments of the present disclosure are applied to the load balancing system. The load balancing system includes the first node and the second node. Based on this, the first route assignment table is first obtained by using the first node. The first route assignment table includes the mapping relationship between the first primary key ID and the first partition ID. The first primary key ID is used for uniquely identifying the first data. The first partition ID indicates the second node. Then, the first node receives the first instruction. The first instruction carries the first primary key ID and the first transaction ID. The first transaction ID indicates the first transaction. The first node is configured to process the first transaction. Based on this, the first node obtains, by using the first route assignment table, the first partition ID based on the first primary key ID carried in the first instruction, and determines the second node based on the first partition ID. The second node is configured to process the first transaction. Then, the first node transmits the first data uniquely identified by the first primary key ID to the second node. In the manner, in a scenario in which data interaction between a plurality of nodes is desired by a transaction, based on a mapping relationship between a primary key ID and a partition ID, data desired to be migrated can be determined by using the primary key ID, and a node to which the data is to be migrated can be determined by using the partition ID, thereby completing migration of the data between the plurality of nodes, without forwarding a user request for many times between the plurality of nodes. Therefore, data migration efficiency is improved.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
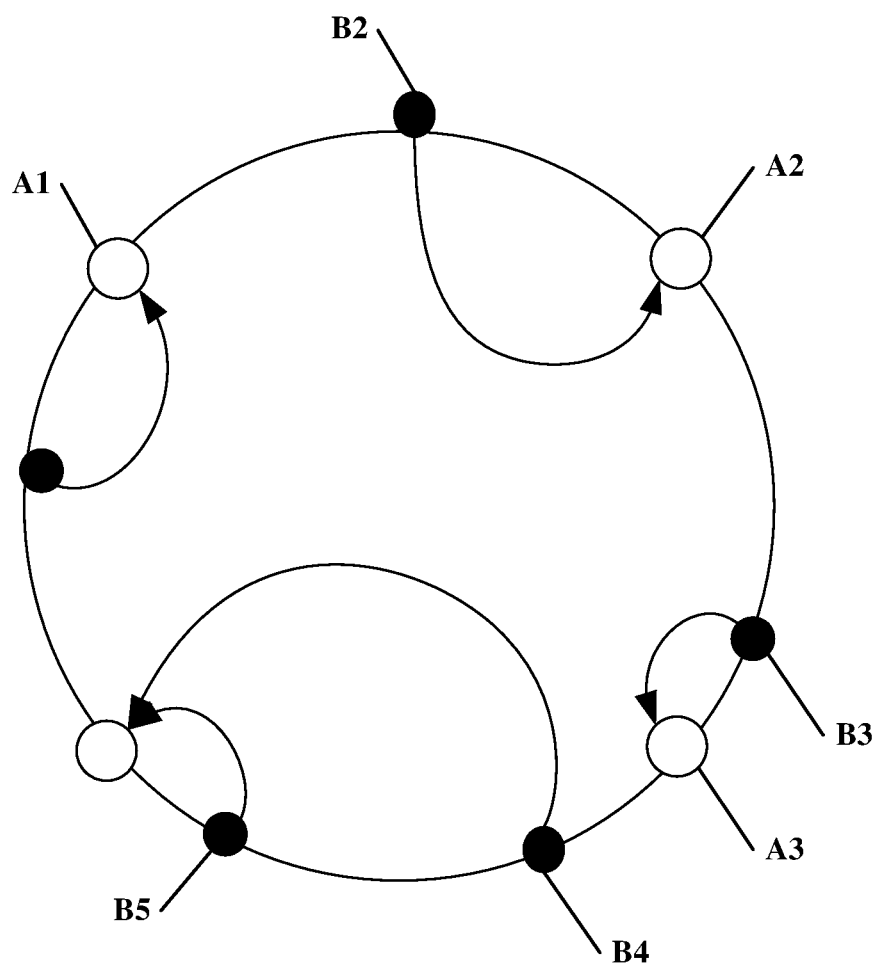
FIG. 1 is a schematic diagram of a consistent hashing algorithm according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

The embodiments of the present disclosure provide a data migration method and apparatus, a computing device, and a storage medium. In a scenario in which data interaction between a plurality of nodes is desired by a transaction, based on a mapping relationship between a primary key ID and a partition ID, data desired to be migrated may be determined by using the primary key ID, and a node to which the data is to be migrated may be determined by using the partition ID, thereby completing migration of the data between the plurality of nodes, without forwarding a user request for many times between the plurality of nodes. Therefore, data migration efficiency is improved.

Terms "first", "second", "third", "fourth", and the like (if existing) in the present disclosure, the claims, and the drawings of the present disclosure are used to distinguish between similar objects, but are not used to describe an order. It is to be understood that data used like this may be interchanged as appropriate, such that the embodiments of the present disclosure described herein may be implemented according to, for example, sequences in addition to those illustrated or described herein. In addition, terms "include", "corresponding to", and any other variants are intended to cover non-exclusive inclusions. For example, a process, method, system, product, or device that includes a series of steps or units is not necessarily limited to those expressly listed steps or units, but may include other steps or units not expressly listed or inherent to such a process, method, product, or device.

With development of Internet services, more and more programs are desired to provide services through the Internet. With growth of services, data migration may be implemented in a distributed cache system by using an LVS. As a virtual layer-four switch cluster system, the LVS forwards a user request according to a target address and a target port. In addition, the LVS forwards the user request without generating traffic, and performs data migration according to a connection processed by a current cluster database service process, thereby implementing load balancing. Based on this, data migration may provide the distributed cache system with high scalability.

However, based on the characteristic that the LVS can forward the user request, in a scenario in which a user transaction is simple (for example, data interaction is performed on one node), load balancing may be performed according to the connection processed by the current cluster database service process. In a scenario in which a user transaction is complex, for example, there is data interaction between a plurality of nodes, data migration based on the LVS may desire the user request to be forwarded for many times between the plurality of nodes, which reduces data migration efficiency. Therefore, how to improve the data migration efficiency in a scenario in which the user transaction is complex becomes a problem urgent to be solved.

Based on this, the embodiments of the present disclosure provide a data migration method. In a scenario in which data interaction between a plurality of nodes is desired by data of a same transaction type, data desired to be migrated and a node to which the data is to be migrated may be determined based on a mapping relationship between a primary key ID and a partition ID, thereby completing migration of the data between the plurality of nodes, without forwarding a user request for many times between the plurality of nodes. Therefore, data migration efficiency is improved.

For ease of understanding, some terms or concepts involved in the embodiments of the present disclosure are explained first.

First: Load Balancing

In a distributed cache system, a load balancing node uniformly sends a request that is sent by a user client to a database side to a back-end database service process to provide a data service. In general, a plurality of peer database service processes in the distributed cache system may externally provide services. Based on this, a user transaction load is uniformly distributed in all database service processes, such that an entire database can externally provide a maximum data service capability.

Second: Node

In this embodiment, the node includes a computing node and a storage node. The computing node is configured to process a computing request of a user. The computing node is a node capable of executing a user request. The storage node is a storage device in the distributed cache system, that is, is configured to store data. The storage node is a node completing execution and committing of a distributed transaction in the distributed cache system. In this embodiment, the computing node and the storage node are servers. In addition, in this embodiment, the node including the computing node and the storage node belongs to a database in a load balancing system.

Third: Two-Phase Commit (2PC)

2PC is an algorithm designed in the fields of computer networks and databases to keep consistency of nodes under a distributed cache system architecture during transaction committing.

Fourth: Consistent Hashing Algorithm

The consistent hashing algorithm is applied extensively to a distributed system. As a hash algorithm, consistent hashing can minimize a change in an existing mapping relationship between a service request and a request processing server when a server is removed or added, to maximally meet a desire for monotonicity.

In certain embodiment(s), a hash value is calculated for each node by using the consistent hashing algorithm. As shown in FIG. 1, FIG. 1 is a schematic diagram of an embodiment of the consistent hashing algorithm according to an embodiment of the present disclosure. As shown in FIG. 1, A1 to A4 denote nodes, and B1 to B5 denote data. A first node that is found clockwise and that is greater than data is a node in which the data is. In certain embodiment(s), a hash value calculated based on a partition ID of the data is compared with hash values of the nodes, and a node corresponding to a first hash value that is found clockwise and that is greater than the hash value calculated based on the partition ID of the data is a node in which the data is. For example, a first node found clockwise for the data B1 is the node A, so that the data B1 is stored in the node A1, and a user request corresponding to the data B1 is executed to perform execution and committing of a transaction corresponding to the data B1. Similarly, a first node found clockwise for the data B2 is the node A2, a first node found clockwise for the data B3 is the node A3, and first nodes found clockwise for the data B4 and the data B5 are the node A4.

Fifth: Load Balancing Based on the Consistent Hashing Algorithm

Figure 2:
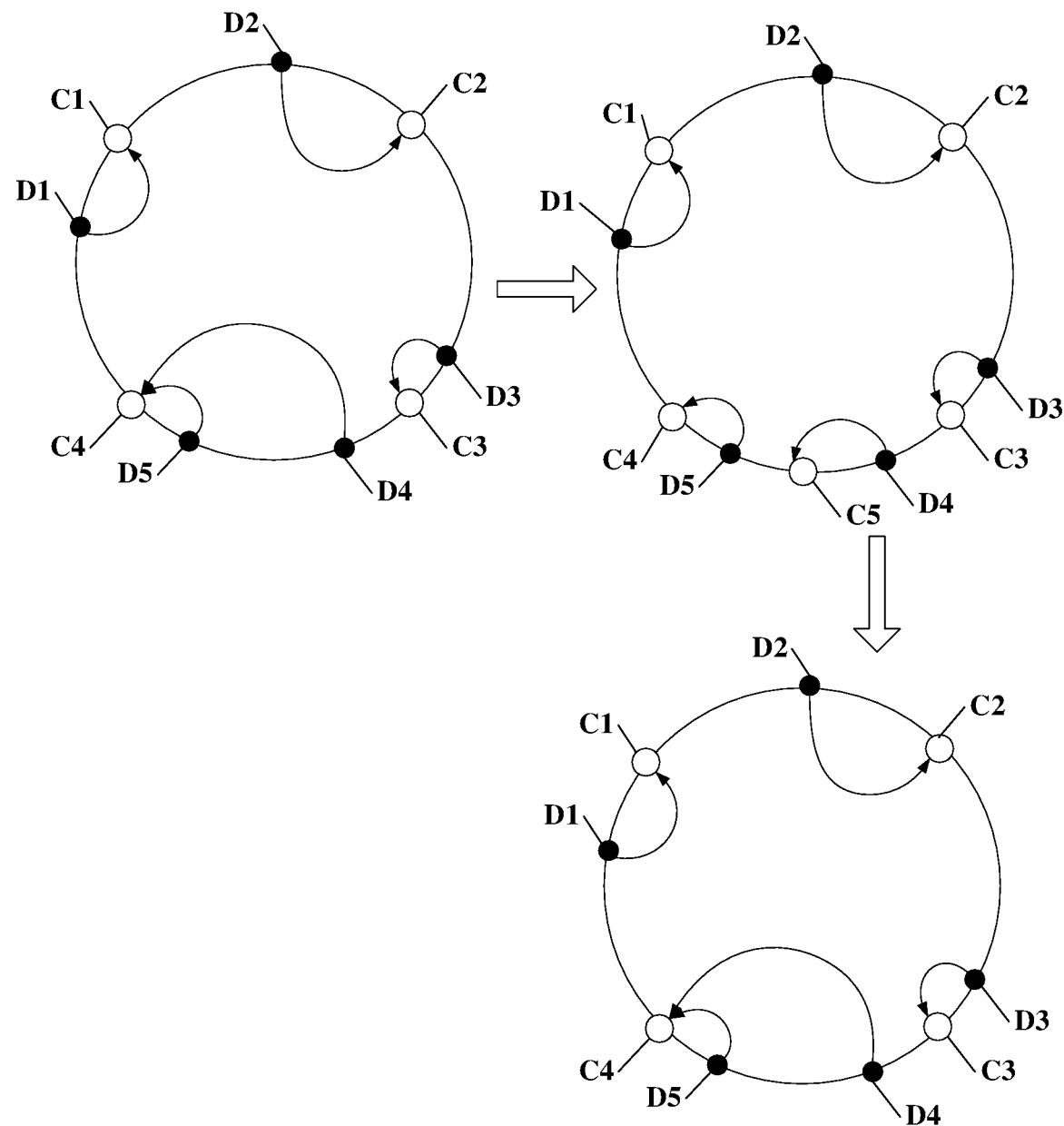
FIG. 2 is a schematic diagram reflecting a load balancing is performed based on a consistent hashing algorithm according to certain embodiment(s) of the present disclosure.

For ease of understanding, based on the embodiment shown in FIG. 1, how to perform load balancing based on the consistent hashing algorithm is briefly described with reference to FIG. 2. FIG. 2 is a schematic diagram of an embodiment in which load balancing is performed based on the consistent hashing algorithm according to an embodiment of the present disclosure. As shown in FIG. 2, C1 to C5 denote nodes, and D1 to D5 denote data. Based on this, if a computing capability is currently desired to be expanded, and a node currently with a maximum computational load is the node C4, the node C5 is added between the node C3 and the node C4. In certain embodiment(s), the data D4 in the data D4 and the data D5 that are originally assigned to the node C4 according to an assignment rule of the consistent hashing algorithm described with reference to FIG. 1 may be assigned to the added node C5, to expand the computing capability, thereby completing load balancing. Then, a reduction of the computing capability may be achieved by merely removing the node C5. In certain embodiment(s), the data D4 assigned to the node C5 may be reassigned to the node C4 according to the assignment rule of the consistent hashing algorithm described with reference to FIG. 1, to reduce the computing capability, thereby completing dynamic load balancing.

In certain embodiment(s), there are many methods for smaller-granularity or more uniform data assignment based on the consistent hashing algorithm, which will not be exhausted herein. In the data migration method proposed in the embodiments of the present disclosure, data in a transaction is desired to be assigned based on the consistent hashing algorithm.

Figure 3:
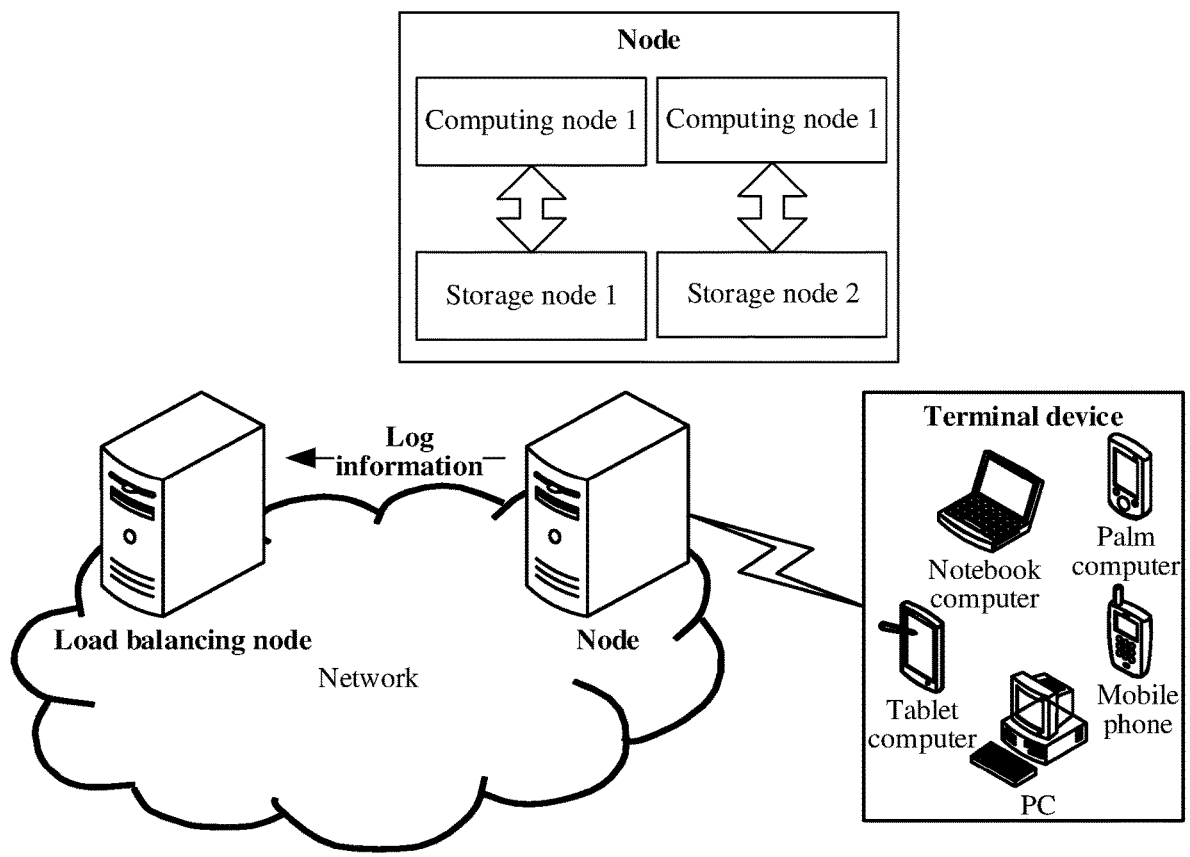
FIG. 3 is a schematic diagram of an architecture of a load balancing system according to certain embodiment(s) of the present disclosure.

The above explains some terms or concepts involved in the embodiments of the present disclosure. The following describes a virtual layered framework in the embodiments of the present disclosure, so as to better understand this solution. Refer to FIG. 3. FIG. 3 is a schematic diagram of an architecture of a load balancing system according to an embodiment of the present disclosure. As shown in FIG. 3, a node in FIG. 3 includes a plurality of computing nodes and a storage node communicating with each computing node. A user sends a request corresponding to a transaction to the computing node by using a terminal device. Then, data corresponding to the transaction is called from the storage node. The data is executed and committed by the storage node, such that the computing node performs execution of the request corresponding to the transaction. In a process in which the request is performed, the node may output log information to the load balancing system, and then the load balancing node analytically processes the log information to determine whether load balancing (that is, data migration) is desired.

Each of the load balancing node and the node in FIG. 3 may be a server, a server cluster including a plurality of servers, a cloud computing center, or the like. This is not limited herein. A client is deployed in the terminal device. The terminal device may be a tablet computer, a notebook computer, a palm computer, a mobile phone, a personal computer (PC), or a voice interaction device shown in FIG. 3.

The terminal device may communicate with the node by using a wireless network, a wired network, or a removable storage medium. The wireless network uses a standard communication technology and/or protocol. The wireless network is generally the Internet, but may alternatively be any network, including, but not limited to, any combination of Bluetooth, a local area network (LAN), a metropolitan area network (MAN), a wide area network (WAN), a mobile private network, or a virtual private network. In some embodiments, the data communication technology may be replaced or supplemented with a custom or private data communication technology. The removable storage medium may be a universal serial bus (USB) flash drive, a mobile hard disk, another removable storage medium, or the like.

Five terminal devices, one node, and one load balancing node are shown in FIG. 3. However, it is to be understood that an example in FIG. 3 is used to understand this solution, and quantities of terminal devices, nodes, and load balancing nodes are flexibly determined in combination with an actual situation.

It can be seen from the system framework shown in FIG. 3 that the node may transmit the log information to the load balancing node by adapting a log generated by the node (for example, adding some output fields). Implementation complexity is low, and impact on the node is reduced. Second, the data migration method of this solution may be performed by adapting an output of the log in the node and adding a corresponding processing logic to the load balancing node, so that implementability is high. The node outputs the log information to transfer computation for load balancing to the load balancing node, so that contention with data generated during transaction execution for a data resource when a load balancing algorithm is executed on the node is reduced. Therefore, a resource utilization is increased, and data migration efficiency is improved.

In the data migration method provided in the embodiments of the present disclosure, migrated data may be traffic-related data, for example, real-time road condition data, vehicle travel data, or driver need data. Therefore, the method provided in the embodiments of the present disclosure may be applied to the field of traffic. Based on this, the following describes an intelligent traffic system (ITS) and an intelligent vehicle infrastructure cooperative system (IVICS). First, the ITS, also referred to as an intelligent transportation system, effectively integrates and applies advanced sciences and technologies (an information technology, a computer technology, a data communication technology, a sensor technology, an electronic control technology, an automatic control technology, operational research, artificial intelligence, and the like) to transportation, service control, and vehicle manufacturing to strengthen a connection between a vehicle, infrastructure, and a user, thereby forming an integrated transportation system to enhance safety, improve efficiency and an environment, and save energy. Second, the IVICS is referred to as a cooperative vehicle infrastructure system for short, and is a development direction of the ITS. The cooperative vehicle infrastructure system comprehensively implements dynamic real-time vehicle-vehicle and vehicle-infrastructure information interaction by using advanced wireless communication and new-generation Internet technologies and the like, and develops active vehicle safety control and cooperative infrastructure management based on full space-time dynamic traffic information acquisition and fusion to fully implement effective cooperation of a person, a vehicle, and infrastructure, enhance traffic safety, and improve traffic efficiency, thereby forming a safe, efficient, and environment-friendly road traffic system.

The data migration method provided in the embodiments of the present disclosure involves a cloud technology. The following further describes the cloud technology. The cloud technology is a hosting technology that unifies a series of hardware, software, and network resources, and the like in a WAN or a LAN to implement calculation, storage, processing, and sharing of data. The cloud technology is a generic term of a network technology, information technology, integration technology, management platform technology, implementation technology, and the like based on commercial-mode implementation of cloud computing. A resource pool may be formed, and is flexibly and conveniently used on demand. A cloud computing technology will become an important support. A background service of a technical network system desires a large quantity of computing and storage resources, for example, a video website, a picture website, and more portals. As the Internet industry is highly developed and applied, each item may have its own identification mark in the future, which is desired to be transmitted to a background system for logical processing. Data of different levels may be processed separately. Many kinds of industry data desire a system support, which can be realized by cloud computing.

As a computing node, cloud computing distributes computing tasks on a resource pools including a large quantity of computers, such that various systems can obtain computing power, storage space, and information services as desired. A network providing resources is referred to as a "cloud". The resources in the "cloud" appear to a user to be infinitely extensible and available at any time. The resources are available on demand and extensible at any time, and the user pays for use.

A capability provider of cloud computing may construct a cloud computing resource pool platform (referred to as a cloud platform for short, generally referred to as infrastructure as a service (IaaS)), and a plurality of types of virtual resources are deployed in a resource pool for an external client to select and use. The cloud computing resource pool includes a computing device (a virtual machine, including an operating system), a storage device, and a network device.

According to logical functions, a platform as a service (PaaS) layer may be deployed on an IaaS layer, and then a software as a service (SaaS) layer is deployed on the PaaS layer. Alternatively, the SaaS layer may be directly deployed on the IaaS layer. PaaS is a platform on which software is run, for example, a database or a web container. SaaS is various transaction software, for example, a web portal or a mass texting device. Generally speaking, SaaS and PaaS are upper layers relative to IaaS.

Second, cloud storage is a novel concept extending and developing based on the concept of cloud computing. A distributed cloud storage system (referred to as a storage system hereinafter) is a storage system that integrates a number of different types of storage devices (the storage device is also referred to as a storage node) in the network through application software or application interfaces by using a function such as a cluster application, a grid technology, or a distributed storage file system to cooperate to externally provide data storage and transaction access functions.

At present, a storage method of the storage system is as follows. A logical volume is created. When the logical volume is created, physical storage space is allocated to each logical volume. The physical storage space may include a disk of one or more storage devices. When a client stores data in a logical volume, that is, stores the data in a file system, the file system divides the data into many portions, each portion being an object. The object includes not only data but also additional information such as a data ID. The file system writes each object to physical storage space of the logical volume. In addition, the file system records storage position information of each object. Therefore, when the client requests to access the data, the file system may enable the client to access the data according to the storage position information of each object.

The storage system allocates the physical storage space to the logical volume through the following process: pre-dividing physical storage space into stripes according to a capacity estimate for an object to be stored in the logical volume (the estimate often has a large margin with respect to an actual capacity for the object to be stored) and a group of a redundant array of independent disks (RAID), one logical volume being understood as one stripe, thereby allocating the physical storage space to the logical volume.

Further, a blockchain is a mode of a computer technology such as distributed data storage, point-to-point transmission, a consensus mechanism, or an encryption algorithm. The blockchain is essentially a decentralized database, and is a string of data blocks associatively generated by using a cryptographic method. Each data block includes information of a batch of network transactions, and is used for verifying validity of the information (anti-counterfeiting) and generating a next block. The blockchain may include a blockchain underlying platform, a platform product service layer, and an application service layer.

The blockchain underlying platform may include a processing module 1102 such as a user management module, a service module, a smart contract module, and an operation management module. The user management module is configured to manage identity information of all blockchain participants, including maintenance of public and private key generation (account management), key management, maintenance of a correspondence between a real identity of a user and a blockchain address, and the like, and when authorized, determine and audit transaction conditions of some real identities and provide a rule configuration for risk control (risk control auditing). The service module is deployed on all blockchain node devices, and is configured to verify validity of a transaction request, and record a valid request on a storage after consensus about the valid request is performed. For a new transaction request, the service module first performs interface adaptation parsing and authentication processing (interface adaptation), then encrypts transaction information by using a consensus algorithm (consensus management), transmits the transaction information to a shared ledger after encryption (network communication), and performs recording and storage. The smart contract module is configured for registration, issuance, triggering, and execution of a contract. A developer may define a contract logic by using a programming language, issue the contract logic on the blockchain (contract registration), and call a key or another event according to a logic of a contract term to trigger execution to perform the contract logic. In addition, a contract upgrade and cancellation function is further provided. The operation management module is configured for deployment in a release process of a product, modification of a configuration, contract setting, cloud adaptation, and visual output of a real-time state during running of the product, for example, alarming, managing a network condition, or managing a health condition of the node device.

The platform product service layer provides a capability and implementation framework of an implementation. The developer may superimpose characteristics of a transaction based on the capability to perform blockchain implementation of a transaction logic. The application service layer provides a blockchain-solution-based application service for a transaction participant to use.

Figure 4:
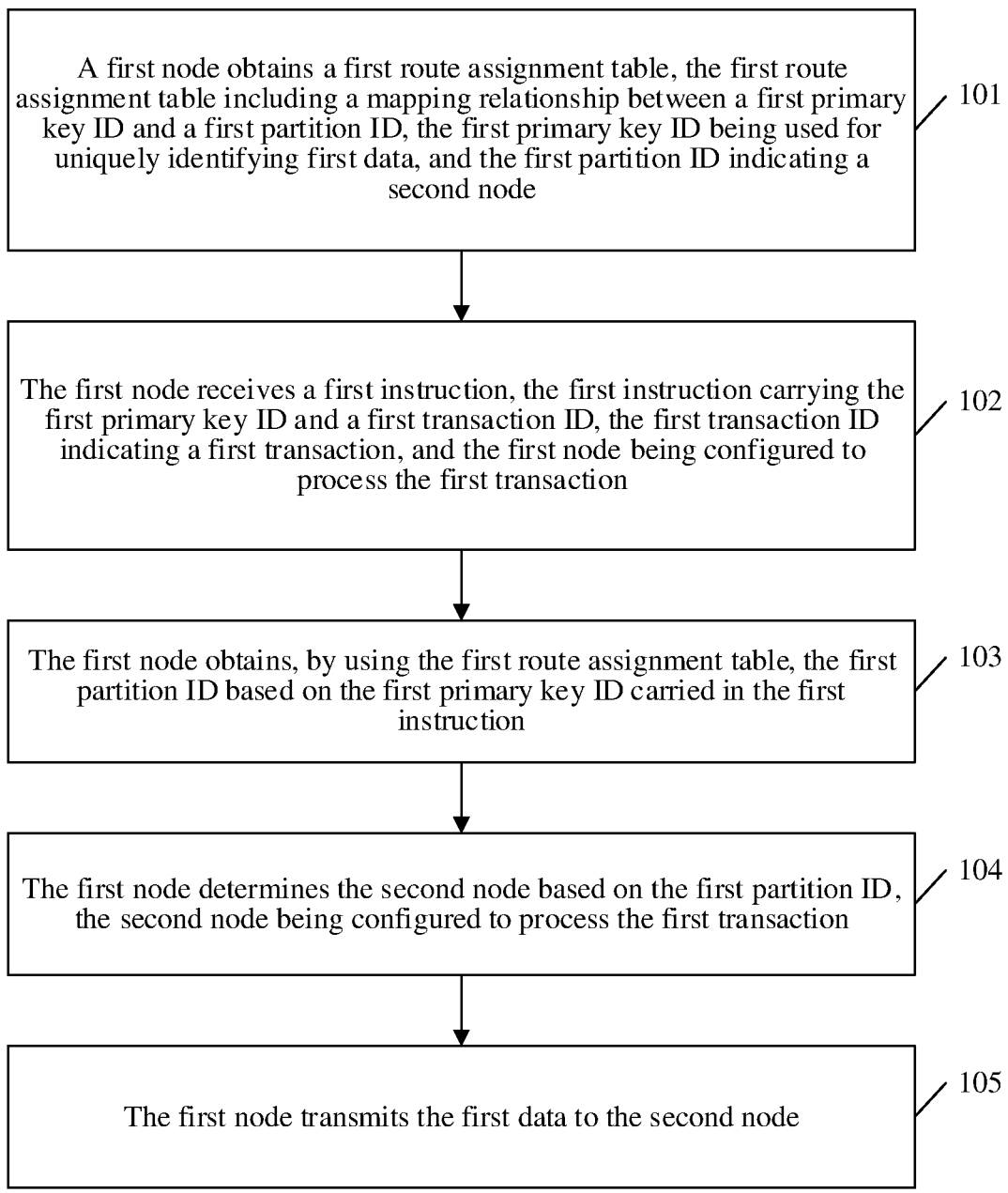
FIG. 4 is a schematic diagram a data migration method according to certain embodiment(s) of the present disclosure.

With reference to the above descriptions, refer to FIG. 4. FIG. 4 is a schematic diagram of an embodiment of a data migration method according to an embodiment of the present disclosure. As shown in FIG. 4, the data migration method in this embodiment of the present disclosure is applied to the load balancing system shown in FIG. 3. It is to be understood that, for ease of understanding, an example in which the load balancing system includes a first node and a second node is used in this embodiment for description. In certain embodiment(s), the load balancing system may further include more nodes, and elaborations are omitted herein. Based on this, an embodiment of the data migration method in this embodiment of the present disclosure includes the following steps:

101: The first node obtains a first route assignment table, the first route assignment table including a mapping relationship between a first primary key ID and a first partition ID, the first primary key ID being used for uniquely identifying first data, and the first partition ID indicating the second node.

In this embodiment, the first obtains the first route assignment table. The first route assignment table includes the mapping relationship between the first primary key ID and the first partition ID. The first primary key ID is used for uniquely identifying first data. The first partition ID indicates the second node. In certain embodiment(s), one primary key ID may uniquely identify one piece of data. For example, a primary key ID 1 is used for uniquely identifying data 1, and a primary key ID 2 is used for uniquely identifying data 2. One partition ID may indicate one node, but one node may be indicated by a plurality of partition IDs. For example, a partition ID 1 is used for indicating a node 1, a partition ID 2 is used for indicating the node 1, and a partition ID 3 is used for indicating a node 2. In certain embodiment(s), the node 1 may be indicated according to the partition ID 1 or the partition ID 2, and the node 2 may be indicated according to the partition ID 3.

Further, the mapping relationship between the first primary key ID and the first partition ID is, for example, a mapping relationship between the partition ID 1 and the primary key ID 1 or a mapping relationship between the partition ID 2 and the primary key ID 2. It is to be understood that, in certain embodiment(s), the first route assignment table may include mapping relationships between a plurality of primary key IDs, a plurality of transaction IDs, and a plurality of partition IDs. Not all mapping relationships are exhausted herein. The example in this embodiment is not to be understood as a limitation on the present disclosure. A primary key ID and a partition ID carried in each piece of data are desired to be flexibly determined according to an actual situation.

102: The first node receives a first instruction, the first instruction carrying the first primary key ID and a first transaction ID, the first transaction ID indicating a first transaction, and the first node being configured to process the first transaction.

In this embodiment, the first node receives the first instruction. The first instruction carries the first primary key ID and the first transaction ID. The first transaction ID indicates the first transaction. The first transaction ID may be carried in a log of the first transaction generated by the first node by executing the first transaction.

The first node may learn based on the first transaction ID in the first instruction that a user initiates an operation on the first transaction at this time, and data desired to be called for this operation on the first transaction is the first data indicated by the first primary key ID.

103: The first node obtains, by using the first route assignment table, the first partition ID based on the first primary key ID carried in the first instruction.

In this embodiment, since the first route assignment table includes the mapping relationship between the first primary key ID and the first partition ID, the first node may obtain the first primary key ID carried in the first instruction by obtaining the first instruction in step 102, and then determine, by using the mapping relationship between the first primary key ID and the first partition ID in the first route assignment table, the first partition ID based on the first primary key ID.

Exemplarily, an example in which the first route assignment table includes the mapping relationship between the partition ID 1 and the primary key ID 1 and the mapping relationship between the partition ID 2 and the primary key ID 2 is used for description. If the first primary ID carried in the first instruction is the primary key ID 1, it may be determined by using the mapping relationship between the partition ID 1 and the primary key ID 1 that the first partition ID is the partition ID 1. Similarly, if the first primary ID carried in the first instruction is the primary key ID 2, it may be determined by using the mapping relationship between the partition ID 2 and the primary key ID 2 that the first partition ID is the partition ID 2. It is to be understood that the example is not to be understood as a limitation on the present disclosure, and the determined partition ID is desired to be determined according to a mapping relationship in the first route assignment table.

104: The first node determines the second node based on the first partition ID, the second node being configured to process the first transaction.

In this embodiment, since one partition ID may indicate one node, the first node may determine the second node based on the first partition ID. Second, since the first instruction received in step 102 further carries the first transaction ID, the determined second node is a node capable of processing the first transaction indicated by the first transaction ID.

Figure 5:
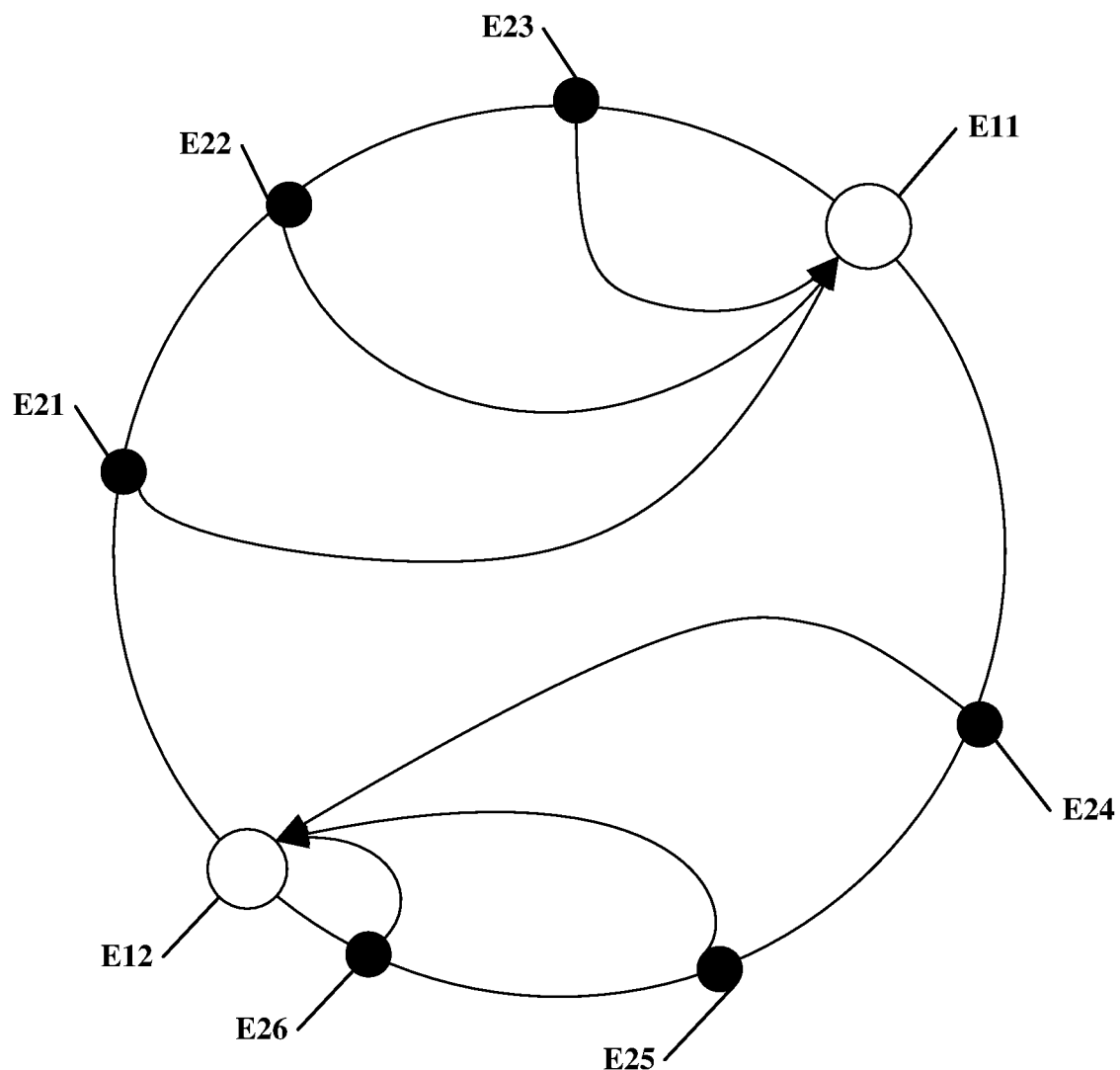
FIG. 5 is a schematic diagram reflecting a partition ID uniquely identifies a node according to certain embodiment(s) of the present disclosure.

In certain embodiment(s), the first node may be indicated by a plurality of partition IDs. For example, the partition ID 1 indicates the node 1, the partition ID 2 indicates the node 2, and the partition ID 3 indicates the node 1. In certain embodiment(s), both the partition ID 1 and the partition ID 3 may indicate that corresponding data is processed by the node 1. For ease of understanding, the following describes, in detail based on the consistent hashing algorithm shown in FIG. 1, how a partition ID identifies a node. FIG. 5 is a schematic diagram of an embodiment in which the partition ID uniquely identifies the node according to an embodiment of the present disclosure. As shown in FIG. 5, E11 and E12 denote nodes, and E21 to E26 denote data. Based on this, hash calculation is first performed on the node E11 to obtain a hash value 1 corresponding to the node E11. Similarly, hash calculation is performed on the node E12 to obtain a hash value 2 corresponding to the node E12.

Then, hash calculation is performed on the partition ID 1 of the data E21 to obtain a hash value 3 corresponding to the partition ID 1 of the data E21. Similarly, hash calculation is performed on the partition ID 2 of the data E22 to obtain a hash value 4 corresponding to the partition ID 2 of the data E22. Hash calculation is performed on the partition ID 3 of the data E23 to obtain a hash value 5 corresponding to the partition ID 3 of the data E23. Hash calculation is performed on a partition ID 4 of the data E24 to obtain a hash value 6 corresponding to the partition ID 4 of the data E24. Hash calculation is performed on a partition ID 5 of the data E25 to obtain a hash value 7 corresponding to the partition ID 5 of the data E25. Hash calculation is performed on a partition ID 6 of the data E26 to obtain a hash value 8 corresponding to the partition ID 6 of the data E26.

Further, for the data E21, it is determined by clockwise searching that the hash value 1 is greater than the hash value 3. In certain embodiment(s), it may be determined that the node E11 is a node in which the data E21 is stored, and the partition ID 1 of the data E21 may uniquely indicates the node E11. Similarly, the node E11 is a node in which the data E22 is stored, and the partition ID 2 of the data E22 may uniquely indicates the node E11. The node E11 is a node in which the data E23 is stored, and the partition ID 3 of the data E23 may uniquely indicates the node E11.

Second, it may be obtained through calculation similar to the that the node E12 is a node in which the data E24 is stored, and the partition ID 4 of the data E24 may uniquely indicates the node E12. The node E12 is a node in which the data E25 is stored, and the partition ID 5 of the data E25 may uniquely indicates the node E12. The node E12 is a node in which the data E26 is stored, and the partition ID 6 of the data E26 may uniquely indicates the node E12. It is to be understood that FIG. 5 and the corresponding example are used to understand how to uniquely indicate a node by using a partition ID, but the example is not to be understood as a limitation on the present disclosure.

105: The first node transmits the first data to the second node.

In this embodiment, after receiving the first instruction in step 102, the first node determines, by using the first primary key ID, the first data uniquely identified by the first primary key ID, and may determine through the steps that the first data desired to be called by the first instruction is currently not data processed by the first node. Therefore, the first data is desired to be transmitted to the second node, and the second node processes the first data to perform processing the first transaction.

This embodiment of the present disclosure provides a data migration method. In the manner, in a scenario in which data interaction between a plurality of nodes is desired by a transaction, based on a mapping relationship between a primary key ID and a partition ID, data desired to be migrated may be determined by using the primary key ID, and a node to which the data is to be migrated may be determined by using the partition ID, thereby completing migration of the data between the plurality of nodes, without forwarding a user request for many times between the plurality of nodes. Therefore, data migration efficiency is improved.

In certain embodiment(s), based on the embodiment corresponding to FIG. 4, in an embodiment of the data migration method provided in this embodiment of the present disclosure, the first route assignment table further includes a mapping relationship between a first index ID and the first partition ID.

The first instruction further includes the first index ID.

That the first node obtains, by using the first route assignment table, the first partition ID based on the first primary key ID carried in the first instruction includes that:

the first node determines, by using the first route assignment table, N partition IDs based on the first index ID carried in the first instruction, the N partition IDs including the first partition ID, and N being an integer greater than or equal to 1; and the first node determines, by using the first route assignment table, the first partition ID from the N partition IDs based on the first primary key ID carried in the first instruction.

In this embodiment, the first route assignment table further includes the mapping relationship between the first index ID and the first partition ID, and the first instruction further includes the first index ID. In certain embodiment(s), when a plurality of pieces of data are stored in a node, a calculation amount may be large if partition IDs are determined by using primary key IDs. One index ID may correspond to at least one partition. Based on this, the first node determines, by using the mapping relationship between the first index ID and the first partition ID in the first route assignment table, the N partition IDs based on the first index ID carried in the first instruction. The N partition IDs include the first partition ID, and N is an integer greater than or equal to 1. Then, the first partition ID in the mapping relationship with the first primary key ID is desired to be determined from the N partition IDs.

Further, the first node determines, by using the mapping relationship between the first primary key ID and the first partition ID in the first route assignment table, the first partition ID from the determined N partition IDs based on the first primary key ID carried in the first instruction. In this way, a range for searching for mapping relationships by using the primary key ID can be reduced, and it can be more ensured that the N partition IDs include the partition ID in a mapping relationship with the primary key ID. For example, the first route assignment table includes the mapping relationship between the partition ID 1 and the primary key ID 1, a mapping relationship between the partition ID 1 and an index ID 1, and a mapping relationship between the partition ID 2 and the index ID 1. In certain embodiment(s), the partition ID 1 and the partition ID 2 may be determined based on the index ID 1, and then the partition ID 1 in the partition ID 1 and the partition ID 2 is determined as the first partition ID based on the primary key ID 1 by using the mapping relationship between the partition ID 1 and the primary key ID 1.

In certain embodiment(s), the first instruction may include a plurality of primary key IDs, and the first index ID may indicate a plurality of primary key IDs. That is, the operation initiated by the user on the first transaction desires a plurality of pieces of data indicated by the plurality of primary key IDs to be called. For example, the first route assignment table includes the mapping relationship between the partition ID 1 and the primary key ID 1, the mapping relationship between the partition ID 2 and the primary key ID 2, the mapping relationship between the partition ID 1 and the index ID 1, and the mapping relationship between the partition ID 2 and the index ID 1, and the first instruction includes the primary key ID 1, the primary key ID 2, and the index ID 1. In certain embodiment(s), the partition ID 1 and the partition ID 2 may be determined based on the index ID 1, or the partition ID 1 and the partition ID 2 may be determined by using the mapping relationships based on the primary key ID 1 and the primary key ID 2. That is, data is in the first node and the second node. In certain embodiment(s), the first node performs calling data indicated by the primary key ID 2, and sends the first data indicated by the primary key ID 1 to the second node to enable the second node to call the first data, thereby completing the first transaction. The first transaction is the 2PC transaction described above.

This embodiment of the present disclosure provides another data migration method. In the manner, at least one partition ID is first determined by using the first index ID. Then, the first partition ID in the mapping relationship is determined from the at least one partition ID based on the first primary key ID. In this way, a range for searching for a plurality of mapping relationships by using the first primary key ID can be reduced, and efficiency of determining the first partition ID based on the first primary key ID can be improved. Therefore, data migration efficiency is improved.

In certain embodiment(s), based on the embodiment corresponding to FIG. 4, in an embodiment of the data migration method provided in this embodiment of the present disclosure, the data migration method may further include that:

the first node obtains a second route assignment table at a first time point, the second route assignment table including a mapping relationship between the first primary key ID and a second partition ID, and the second partition ID indicating the first node.

That the first node obtains a first route assignment table includes that:

the first node obtains the first route assignment table at a second time point, the second time point being later than the first time point.

After the first node transmits the first data uniquely identified by the first primary key ID to the second node, the method further includes that:

the first node deletes the second route assignment table.

In this embodiment, the first node obtains the second route assignment table at the first time point. In certain embodiment(s), the second route assignment table includes the mapping relationship between the first primary key ID and the second partition ID. The second partition ID indicates the first node. The first node is configured to process the first transaction. That is, In certain embodiment(s), based on the mapping relationship in the first route assignment table, the first data uniquely identified by the first primary key ID is data to be managed by the first node. Further, the first node obtains the first route assignment table at the second time point, and the second time point is later than the first time point. That is, the first route assignment table is obtained by updating the mapping relationship between the first primary key ID and the second partition ID in the second route assignment table. Based on this, after the first node transmits the first data to the second node in 105, the first data has been migrated, according to the latest route assignment table, to the second node managing the first data. In certain embodiment(s), the second route assignment table may be deleted.

In certain embodiment(s), the first instruction may be a first statement instruction generated for the first transaction when the user initiates the operation on the first transaction. That is, after the user initiates the operation on the first transaction, the first node receives the first statement instruction (that is, the first instruction) for the first transaction, and determines based on the first instruction that the first transaction is desired to be executed, that is, the first data is desired to be called. In certain embodiment(s), after the first data and the second node are determined in the step, the first data is sent to the second node.

In another possibility, a first statement instruction generated for the first transaction when the user initiates the operation on the first transaction is sent to the second node, and the second node may determine the first data and the second node (that is, the current node) through steps similar to the foregoing. However, the first data is yet not migrated to the second node. Since the second node may retain the obtained second route assignment table when migration of the first data is not performed, the second node determines, based on the first primary key ID by using the mapping relationship between the first primary key ID and the second partition ID in the second route assignment table, that the first data is currently on the first node indicated by the second partition ID. Therefore, the second node is desired to generate a second statement instruction for the first transaction, and send the second statement instruction (that is, the first instruction) for the first transaction to the first node to enable the first node to determine the first data and the second node based on the first instruction. The second receives the first data sent by the first node, and performs the first transaction. In addition, after the second node receives the first data sent by the first node, the second node deletes the second route assignment table.

Figure 6:
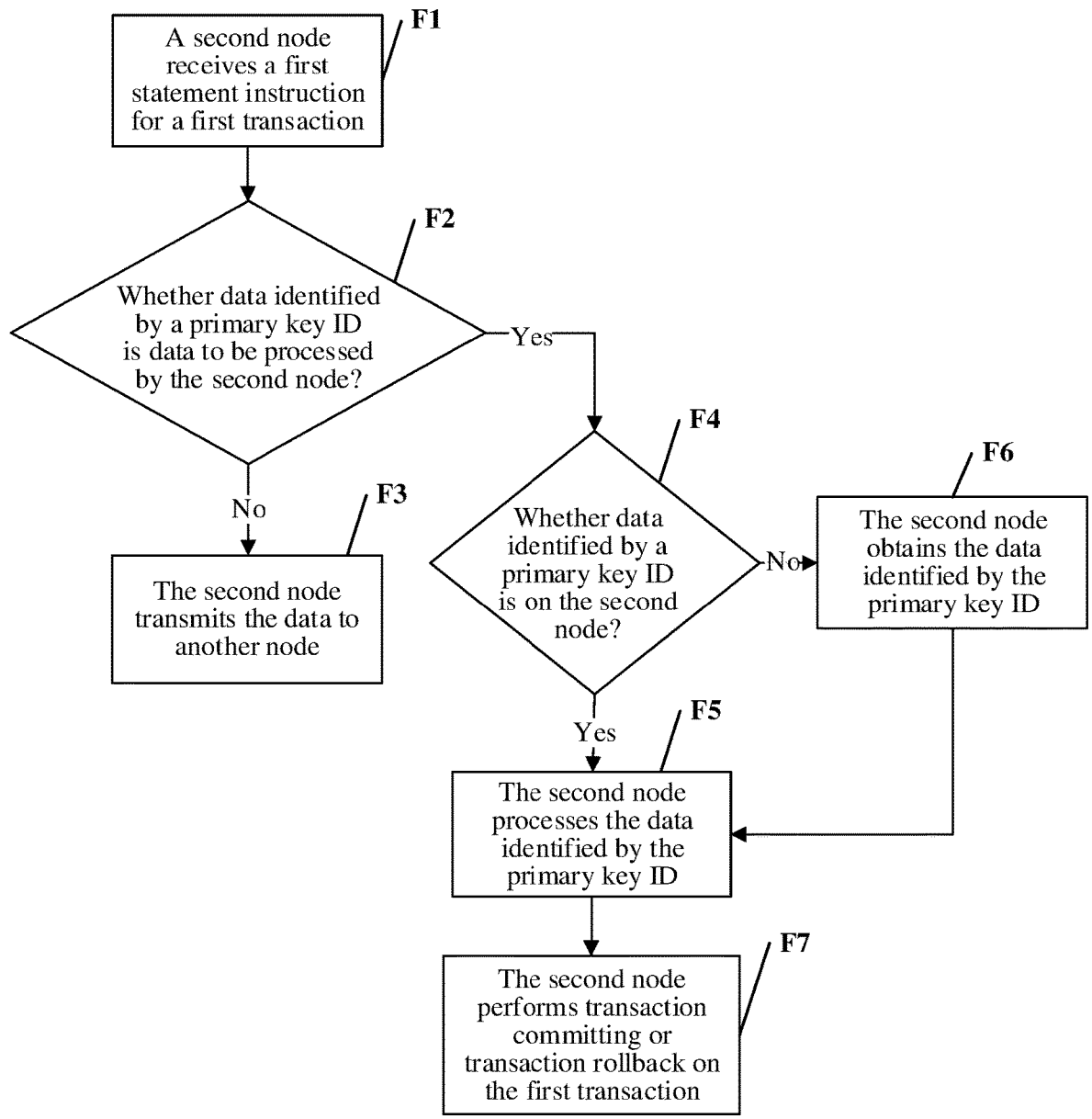
FIG. 6 is a schematic flowchart of data migration according to certain embodiment(s) of the present disclosure.

In order to describe the second scenario, refer to FIG. 6. FIG. 6 is a schematic flowchart of data migration according to an embodiment of the present disclosure. As shown in FIG. 6, in step F1, the second node receives the first statement instruction for the first transaction. The first statement instruction for the first transaction carries a primary key ID capable of identifying data and the first transaction ID. In step F2, the second node determines whether data identified by the primary key ID is data to be processed by the current node (that is, the second node), that is, data to be processed by the second data. That is, in the manner, a partition ID is obtained by using the first route assignment table based on the primary key ID carried in the data. If the partition ID indicates another node, it is determined that the data is not data to be processed by the second node, and step F3 is performed; or if the partition ID indicates the second node, it is determined that the data is data to be processed by the second node, and step F4 is performed. In step F3, since the partition ID indicates the another node, the second node transmits the data to the another node. In step F4, the second node is desired to further determine whether the data identified by the primary key ID is on the second node. If the data identified by the primary key ID is on the second node, step F5 is performed; or if the data identified by the primary key ID is not on the second node, step F6 is performed. In step F5, the second node calls the data identified by the primary key ID to perform the first transaction.

If the data identified by the primary key ID is not on the second node, in step F6, since the data identified by the primary key ID is not on the second node, the second node is desired to determine, based on the second route assignment table that is not updated, a node storing the data identified by the primary key ID, and send the second statement instruction for the first transaction to the node. Then, the node transmits the data identified by the primary key ID to the second node by using a method similar to the foregoing, such that the second node obtains the data identified by the primary key ID, and performs step F5. Finally, in step F7, the second node performs transaction committing on the first transaction. It is to be understood that the example in FIG. 6 is used to understand this solution, and is not to be understood as a limitation on the present disclosure.

This embodiment of the present disclosure provides another data migration method. In the manner, in a scenario in which data interaction between a plurality of nodes is desired by a same transaction type, whether received data is data to be processed by a current node is further determined based on a mapping relationship. If the received data is data to be processed by the current node, data processing is performed. If the received data is not processed by the current node, the data is migrated to a node corresponding to the data. In this way, processing of data of the same transaction type and migration between the plurality of nodes are performed. Therefore, the data migration efficiency is further improved.

It is to be understood that the load balancing system further includes a load balancing node. When the load balancing node determines that load balancing is desired, or determines that the first node is a hotspot (that is, a load bearable by the first node is exceeded), or determines that the first node fails, the update step may be performed. The following describes how the load balancing node determines that a route assignment table is desired to be updated and how to update.

In certain embodiment(s), based on the embodiment corresponding to FIG. 4, in an embodiment of the data migration method provided in this embodiment of the present disclosure, the load balancing system further includes a load balancing node.

The data migration method further includes that:
the load balancing node obtains a second route assignment table, the second route assignment table including a mapping relationship between the first primary key ID and a second partition ID, the second partition ID indicating the first node, and the first node being configured to process the first transaction;
the load balancing node determines the first data and the second node in response to determining that a data migration condition is satisfied, the first data being data desired to be migrated to the second node;
the load balancing node replaces the second partition ID in the second route assignment table with the first partition ID to obtain the first route assignment table, the first partition ID being used for uniquely identifying the second node; and the load balancing node transmits the first route assignment table to the first node and the second node.

In this embodiment, it can be seen from the system architecture shown in FIG. 3 that the load balancing system further includes the load balancing node. Based on this, the load balancing node may obtain the second route assignment table through system initialization. The second route assignment table includes the mapping relationship between the first primary key ID and the second partition ID. The second partition ID is used for uniquely identifying the first node. In certain embodiment(s), the second route assignment table is a route assignment table obtained through initialization. In a scenario in which initialization is desired, a node is used for the first time and data is imported, or a node performs data migration, or the like. An initialization scenario is not limited herein.

Further, a node may generate corresponding log information during data processing. The load balancing node receives log information transmitted by each node, and determines a result obtained by statistically analyzing the log information to perform load balancing processing, hotspot data migration, data migration of a failing node, or the like by using the result. In this embodiment, log information is added to each component of a node, or corresponding field information is added to original log information, so that impact on a processing logic of an existing system and impact on performance of each node are reduced. In certain embodiment(s), in this embodiment, when data corresponding to a transaction of each transaction type is processed, a node is desired to generate the following log information.

1: Starting transaction log information: the starting transaction log information includes transaction tag information, a transaction ID, a node ID, and other field information. In this embodiment, the transaction tag information is used for indicating carrying. Log information carrying the transaction tag information is log information desired in this solution. The load balancing node does not analytically process log information that does not carry the transaction tag information. Therefore, log information processing efficiency is improved.

2: Starting statement log information: the starting statement log information includes the transaction tag information, the transaction ID, the node ID, a statement ID, and other field information. The statement ID instructs the node to perform an operation of a starting statement.

3: Creation, read, update and deletion record log information: the creation, read, update and deletion record log information includes a primary key recording format, and further includes a secondary index recording format in some scenarios. Log information of the primary key recording format includes the transaction tag information, the transaction ID, the node ID, the statement ID, a primary key ID, a partition ID, and other field information. Second, log information of the secondary index recording format includes the transaction tag information, the transaction ID, the node ID, the statement ID, a primary key ID, a partition ID, an index ID, and other field information. There is a mapping relationship between the index ID, the primary key ID, and the partition ID. Therefore, when the data carries the index ID and the primary key ID, the node corresponding to the data may be more accurately determined.

4: Transaction committing log information or transaction rollback log information: the transaction committing log information or transaction rollback log information includes the transaction tag information, the transaction ID, the node ID, and other field information, and further carries a 2PC transaction ID if the transaction is a 2PC transaction. It may be determined by using the log information that data interaction between a plurality of nodes has been performed for the data in the transaction.

It is to be understood that the above uses execution of one transaction in this solution to describe the log information desired to be obtained in this solution. The other field information may output more other information as desired for more flexible analysis on the user transaction in more dimensions. Second, for each operation in a transaction, including creation, read, update, deletion or the like, log information is generated in this solution by using the primary key recording format or the primary key recording format and the secondary index recording format.

Further, since each node may generate corresponding log information when processing data, the load balancing node may receive the log information transmitted by each node, statistically analyze the log information to obtain a statistical result, and determine, based on the statistical result, whether the data migration condition is satisfied. If the data migration condition is not satisfied, the system is not desired to perform data migration between nodes. If the data migration condition is satisfied, the load balancing node determines data desired to be migrated and a node receiving the data desired to be migrated.

In certain embodiment(s), the load balancing node determines the first data, and the first data is data desired to be migrated to the second node. That is, the first data and the second node may be determined. Since the second route assignment table includes the mapping relationship between the first primary key ID and the second partition ID, the second partition ID indicates the first node, and the first data uniquely indicated by the first primary key ID is desired to be migrated to the second node, the mapping relationship in the second route assignment table is desired to be updated. Based on this, the load balancing node replaces the second partition ID in the second route assignment table with the first partition ID to obtain the first route assignment table. That is, the obtained first route assignment table includes the mapping relationship between the first primary key ID and the first partition ID. The first partition ID is used for uniquely identifying the second node. Finally, the load balancing node transmits the first route assignment table to the first node and the second node, such that after receiving the first data, the first node or the second node may migrate or perform other processing on the first data in the manner described in the embodiments by using the mapping relationship in the first route assignment table.

This embodiment of the present disclosure provides a route assignment table update method. In the manner, after a route assignment table is obtained through initialization, in actual running of the system, load balancing may be desired, a hotspot may be reduced, or there may be a failing node. In certain embodiment(s), data migration is performed between nodes. Data desired to be migrated and a node receiving the data desired to be migrated are determined based on a transaction ID. After a mapping relationship in the route assignment table is updated, an updated route assignment table is sent to each node, to make more possible that each node may perform data processing based on the updated route assignment table and to enhance processing accuracy of the node. Therefore, stability and data processing efficiency of the system are improved.

Further, in a process of executing each transaction, the load balancing node may obtain log information about each transaction. After the load balancing node performs analytically processing the log information, a cross-node transaction graph of 2PC transaction execution in the system may be constructed. First, it can be seen based on the embodiments that log information used in this embodiment of the present disclosure includes the starting transaction log information, the starting statement log information, the creation, read, update and deletion record log information, and the transaction committing log information or transaction rollback log information. For ease of understanding, exemplarily, an example in which the load balancing system includes the node 1, the node 2, a node 3, a node 4, and the load balancing node and is applied to a cross-node data interaction scenario is used for description.

First, for a user A, there is [100000001][1500][Beijing], where [100000001] represents a primary key ID of numerical information of the user A, [1500] represents numerical information of the user A, and [Beijing] represents a partition ID of the numerical information of the user A. For a user B, there is [075500567]1[300][Guangdong], where [075500567] represents a primary key ID of numerical information of the user B, [300] represents numerical information of the user B, and [Guangdong] represents a partition ID of the numerical information of the user B. During initialization, the numerical information of the user A is assigned to the node 1, and the numerical information of the user B is assigned to the node 3. In certain embodiment(s), when 300 is desired to be transferred from an account of the user A to an account of the user B, the following log information may be obtained:

[REBALANCE][4567896128452][1][BEGIN]
[REBALANCE][4567896128452][1][01][UPDATE]
[REBALANCE][4567896128452][1][100000001][BALANCE: −300][UPDATE]
[REBALANCE][4567896128452][3][02][UPDATE]
[REBALANCE][4567896128452][3][075500567][BALANCE: +300][UPDATE]
[REBALANCE][4567896128452][1][2PC][COMMIT].

First, it can be seen from "[2PC]" in "[REBALANCE] [4567896128452][1][2PC][COMMIT]" in the log information that this transaction is a 2PC transaction. Secondly, it can be seen from a transaction ID "[4567896128452]" in the log information that the log information is all log information generated when the same transaction is executed. Further, it can be seen from the log information "[REBALANCE][4567896128452]1[1][100000001][BALANCE: −300][UPDATE]" and "[REBALANCE][4567896128452][3][075500567][BALANCE: +300][UPDATE]" that on the node 1, [300] in data indicated by a primary key ID [100000001] is desired to be migrated to data indicated by a primary key ID [075500567], and the data indicated by the primary key ID [075500567] is on the node 3. Thus, it can be seen that the node 1 is desired to deduct [300] from numerical information [1500] indicated by the primary key ID [100000001], and the node 3 is desired to add [600] to numerical information [300] indicated by the primary key ID [075500567]. After both the node 1 and the node 3 perform data committing, the numerical information indicated by the primary key ID [100000001] on the node 1 changes to [1200], and the numerical information indicated by the primary key ID [075500567] on the node 3 changes to [600].

Figure 7:
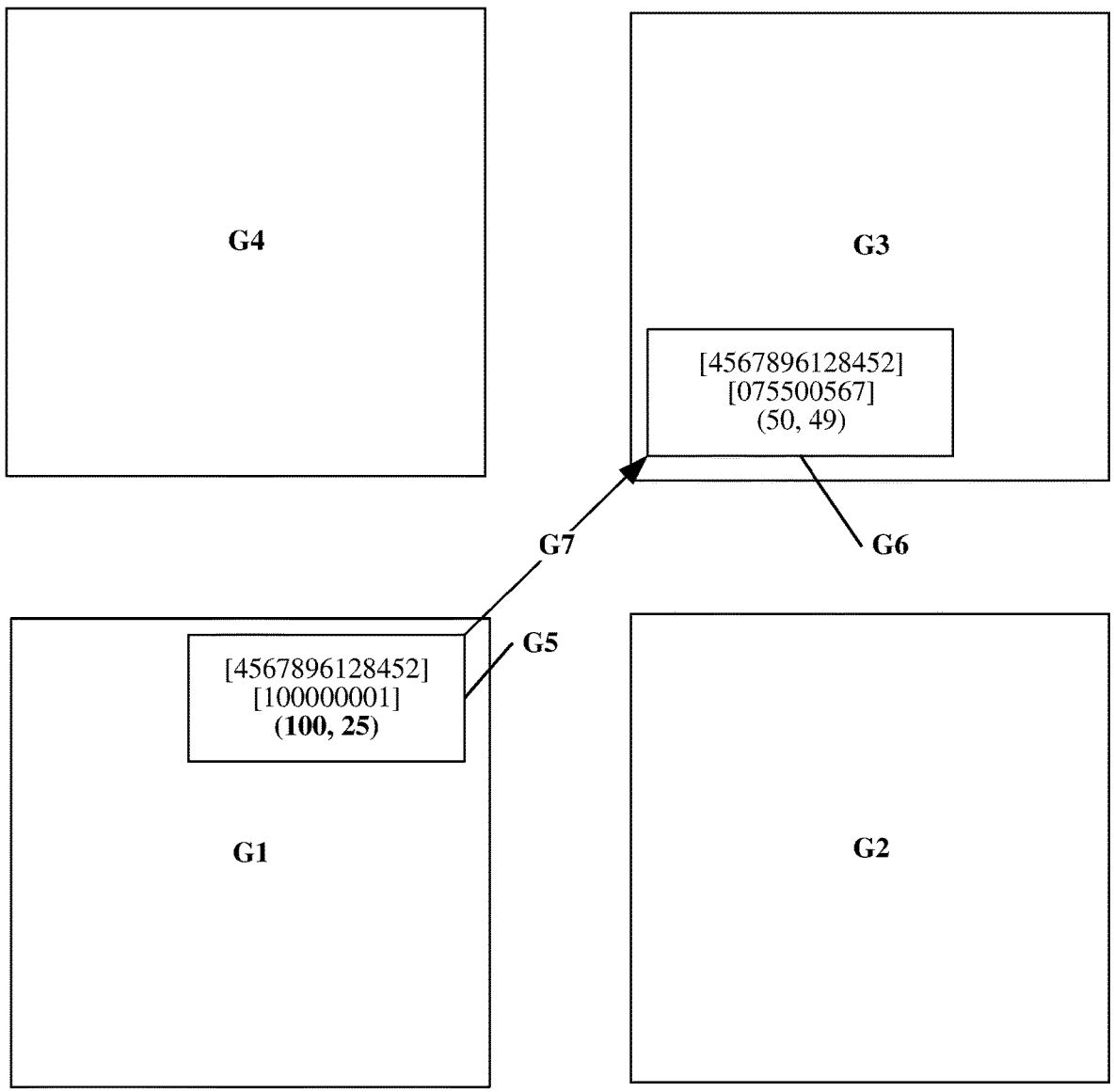
FIG. 7 is a schematic diagram of an embodiment of a cross-node transaction graph according to certain embodiment(s) of the present disclosure.

Further, the load balancing node may process the log information about the transaction to obtain FIG. 7. FIG. 7 is a schematic diagram of an embodiment of the cross-node transaction graph according to an embodiment of the present disclosure. As shown in FIG. 7, G1 denotes the node 1, G2 denotes the node 2, G3 denotes the node 3, G4 denotes the node 4, G5 denotes a data node storing data indicated by the primary key ID [100000001] in the node G1, G6 denotes a data node storing data indicated by the primary key ID [075500567] in the node G3, and G7 denotes a cross-node edge. Based on this, the load balancing node determines a node sending out a transaction execution statement as a starting point of the edge (that is, the node G5 in FIG. 7) in the cross-node transaction graph, and determines a node receiving the transaction execution statement as an ending point of the edge (that is, the node G6 in FIG. 7). If the data indicated by the primary key ID [100000001] is a data node in the node G1, and the data indicated by the primary key ID [075500567] is a data node in the node G3, a directed arrow between the two data nodes represents an execution sequence as the edge in the cross-node transaction graph. If the edge crosses two nodes, that is, the cross-node edge G7 shown in FIG. 7, it indicates that the transaction indicated by the transaction ID [4567896128452] is a 2PC transaction.

Second, (100, 25) in the data node G5 storing the data indicated by the primary key ID [100000001] in the node G1 represents that the data node G5 processes 100 transactions and 25 of the 100 transactions are 2PC transactions. Similarly, (50, 49) in the data node G6 storing the data indicated by the primary key ID [075500567] in the node G3 represents that the data node G6 processes 50 transactions and 49 of the 50 transactions are 2PC transactions. Therefore, the cross-node transaction graph, shown in FIG. 7, in the load balancing system may be constructed in a manner similar to the by using log information generated by a computing node when executing a plurality of transactions.

The following describes various scenarios in which the load balancing node determines, by using log information about each transaction, whether the data migration condition is satisfied.

In certain embodiment(s), based on the embodiment corresponding to FIG. 4, in an embodiment of the data migration method provided in this embodiment of the present disclosure, the data migration condition is that a ratio of a 2PC transaction processing throughput to a total transaction processing throughput of a node is greater than a first preset threshold.

The operation of determining that a data migration condition is satisfied includes:
the load balancing node obtains a 2PC transaction ID in response to that log information transmitted by the first node is received in a first preset period, the log information transmitted by the first node including the 2PC transaction ID, and the 2PC transaction ID indicating that the log information is generated after the first node processes a 2PC transaction;
the load balancing node statistically obtains a total transaction processing throughput of the first node based on the log information transmitted by the first node;
the load balancing node statistically obtains a 2PC transaction processing throughput of the first node based on the 2PC transaction ID; and
the load balancing node determines, in response to that a ratio of the 2PC transaction processing throughput of the first node to the total transaction processing throughput of the first node is greater than the first preset threshold, that the data migration condition is satisfied.

In this embodiment, the data migration condition is that a ratio of a 2PC transaction processing throughput to a total transaction processing throughput of a node is greater than the first preset threshold. Based on this, if the load balancing node can receive, in the first preset period, the log information transmitted by the first node, it can be seen from the embodiments that the log information transmitted by the first node may include the first transaction ID. If the first node processes the 2PC transaction, the log information transmitted by the first node further includes the 2PC transaction ID. The 2PC transaction ID indicates that the log information is generated after the first node processes the 2PC transaction. Therefore, the load balancing node statistically obtains the total transaction processing throughput of the first node based on the log information transmitted by the first node. The total transactions processing throughput of the first node is a total quantity of transactions executed by the first node in the first preset period. Second, the load balancing node statistically obtains the 2PC transaction processing throughput of the first node based on the 2PC transaction ID. The 2PC transaction processing throughput of the first node is a total quantity of 2PC transactions executed by the first node in the first preset period. Then, the ratio of the 2PC transaction processing throughput of the first node to the total transaction processing throughput of the first node is calculated. If the ratio is greater than the first preset threshold, the load balancing node determines that the data migration condition is satisfied.

In certain embodiment(s), the preset period may be 60 seconds and 5 minutes. Whether the preset period is desired to be adjusted is desired to be determined according to a running status of the system. Alternatively, the preset period may be adjusted online as desired by the user. The preset period is to make a compromise between a load balancing adjustment frequency and an adjustment delay acceptable by the user, so as to achieve a best load balancing effect. Obtaining the load balancing adjustment frequency also desires analysis and organization of a user load of each node.

Second, the first preset threshold may be 5%, 10%, or the like. In an example in which the first preset threshold is 5%, when a throughput of data related to a first transaction type exceeds 5% of a data processing throughput of each node, it is determined that the data migration condition is satisfied. In certain embodiment(s), load balancing adjustment is desired to be performed on the entire system by taking the first transaction type as a unit, to reduce the throughput of the data related to the first transaction type during execution within a range of the first preset threshold (5%). Load balancing adjustment stability may be improved based on the first preset threshold. In general, when the distributed system is adjusted to an extent, some data associated with a transaction cannot be assigned to one computing node for execution, and then a 2PC transaction is generated. That is, data carrying a same transaction ID may be distributed in different nodes, and a transaction type indicated by the transaction ID is a 2PC transaction. Based on this, performing adjustment after a data throughput in the distributed system is reached may fluctuate a processing capability of each node due to migration of data between the nodes, and further reduce data processing efficiency of the node. Therefore, the load balancing node may determine, during load balancing by using the first preset threshold, a data migration degree at which data migration may be stopped. In this way, a load balancing effect is improved.

For ease of understanding, FIG. 7 is used as an example, and the first preset threshold is 10%. In certain embodiment(s), for the node G1, a total transaction processing throughput of the node G1 is 100, and a 2PC transaction processing throughput of the node G1 is 25. A ratio of the 2PC transaction processing throughput of the node G1 to the total transaction processing throughput of the node G1 is 25%, exceeding the first preset threshold, so that it is determined that load balancing is desired. Second, for the node G3, a total transaction processing throughput of the node G3 is 50, while a 2PC transaction processing throughput is 49. A ratio of the 2PC transaction processing throughput of the node G3 to the total transaction processing throughput of the node G3 is 98%, also exceeding the first preset threshold, so that it is determined that load balancing is desired.

It may be understood that both the preset period and the first preset threshold that are described in the example are desired to be flexibly determined according to the running status of the system and running parameters of the system, and numerical values are not to be understood as a limitation on the present disclosure.

This embodiment of the present disclosure provides a method for determining that the data migration condition is satisfied. In the manner, a data throughput during execution of a same transaction is determined based on a transaction ID, and whether data migration is desired may be determined based on the first preset threshold, thereby improving feasibility of this solution. Second, the load balancing node may determine, during load balancing by using the first preset threshold, a data migration degree at which data migration may be stopped. In this way, the load balancing effect is improved. That is, fluctuation of the processing capability of each node due to data between the nodes is avoided, thereby improving the data processing efficiency of the node.

In certain embodiment(s), based on the embodiment corresponding to FIG. 4, in an embodiment of the data migration method provided in this embodiment of the present disclosure, the data migration condition is that total memory usage of a node is greater than a second preset threshold.

The operation of determining that a data migration condition is satisfied includes:
receiving, in a second preset period, total memory usage of the first node transmitted by the first node, the total memory usage indicating a memory resource occupied by a plurality of transactions processed by the first node; and
determining, by the load balancing node in response to that the total memory usage of the first node is greater than the second preset threshold, that the data migration condition is satisfied.

In this embodiment, the data migration condition is that total memory usage of a node is greater than the second preset threshold, and is used for determining whether the node is a hotspot. Based on this, if the load balancing node can receive, in the second preset period, the total memory usage of the first node transmitted by the first node, the total memory usage indicating the memory resource occupied by the plurality of transactions processed by the first node, and the total memory usage of the first node is greater than the second preset threshold, the load balancing node determines that the data migration condition is satisfied.

In certain embodiment(s), whether the node is a hotspot may be determined in another manner, for example, a ratio of a total quantity of transactions processed by the node to a total quantity of transactions processed by each computing node in the system, a memory resource utilization of the node, or management on another resource utilization in the node. Therefore, a manner, provided in this embodiment, in which the node is determined as a hotspot in response to determining that a resource utilization of the node is greater than the second preset threshold is not to be understood as the implementation of determining a hotspot.

In certain embodiment(s), the second preset period may be 60 seconds and 5 minutes, and may have duration the same as or different from that of the first preset period. A numerical value of the second preset period is not limited herein. Second, the second preset threshold may be 85% 90%, or the like. In an example in which the second preset threshold is 85%, the load balancing system includes the node 1 and the node 2, total memory usage of the node 1 is 95%, and total memory usage of the node 2 is 60%. In certain embodiment(s), the node 1 may be determined as a hotspot, and it is determined that the data migration condition is satisfied. Subsequent data migration desires data on the node 1 to be migrated to the node 2 or another non-hotspot node.

Figure 8:
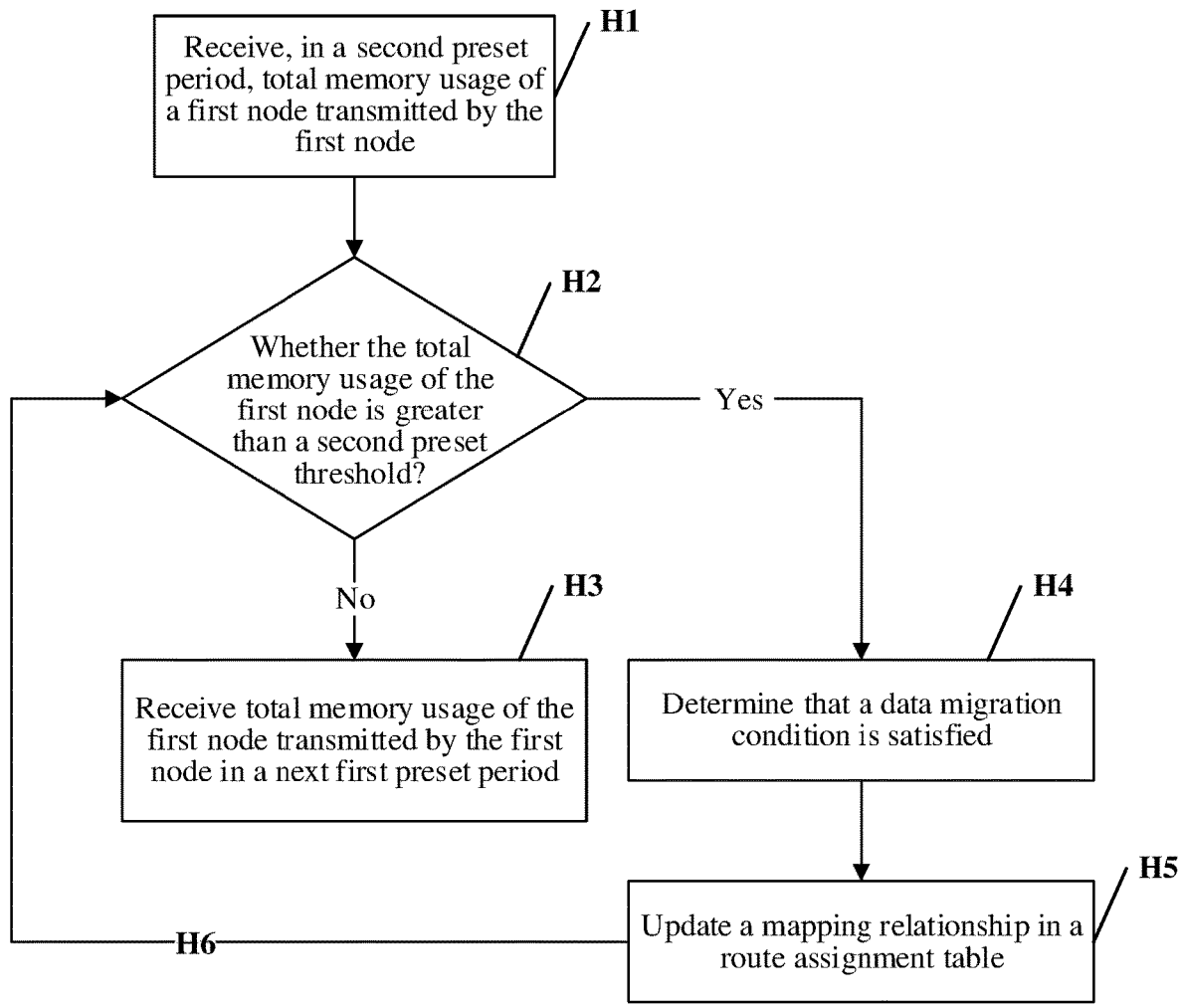
FIG. 8 is a schematic flowchart of determining that a data migration condition is satisfied according to certain embodiment(s) of the present disclosure.

For ease of understanding, refer to FIG. 8. FIG. 8 is a schematic flowchart of determining that the data migration condition is satisfied according to an embodiment of the present disclosure. As shown in FIG. 8, in step H1, the load balancing node receives, in the second preset period, the total memory usage of the first node transmitted by the first node. In step H2, the load balancing node determines whether the total memory usage of the first node is greater than the second preset threshold. If the total memory usage of the first node is not greater than the second preset threshold, step H3 is performed; or if the total memory usage of the first node is greater than the second preset threshold, step H4 is performed. In step H3, the load balancing node receives total memory usage of the first node transmitted by the first node in a next first preset period, and processes the log information based on a method similar to step H1 and step H2. In step H4, since the total memory usage of the first node is greater than the second preset threshold, that is, the first node is a hotspot, the load balancing node determines that the data migration condition is satisfied.

Therefore, in step H5, the load balancing node determines, based on the manner described in the embodiments, data desired to be migrated and a node receiving the data desired to be migrated, and updates a mapping relationship in a route assignment table. Further, in step H6, the load balancing node sends an updated route assignment table to each node in the system, such that the first node migrates, based on the updated route assignment table, some data born by the first node. After data migration is performed, the load balancing node may further determine whether current total memory usage of the first node is greater than the second preset threshold by using the method in step H2, until the hotspot is reduced. It is to be understood that the example in FIG. 8 is used to understand this solution, and a process and implementation steps are desired to be flexibly adjusted according to an actual situation.

This embodiment of the present disclosure provides another method for determining that the data migration condition is satisfied. In the manner, the total memory usage of the first node is obtained, and whether data migration is desired may be determined based on the second preset threshold, thereby improving feasibility of this solution. Second, when load balancing is performed, if there is a hotspot in the system, the hotspot may be reduced by data migration, thereby ensuring stability of the load balancing system.

In certain embodiment(s), based on the embodiment corresponding to FIG. 4, in an embodiment of the data migration method provided in this embodiment of the present disclosure, the load balancing system further includes a third node.

The log information transmitted by the first node further includes the first transaction ID and the first primary key ID.

The data migration method further includes that:
the load balancing node receives log information transmitted by the second node and log information transmitted by the third node, the log information transmitted by the second node including the first transaction ID and the first primary key ID, and the log information transmitted by the third node including the first transaction ID and the first primary key ID.

That the load balancing node determines the first data and the second node includes that:
the load balancing node collects statistics on the log information transmitted by the first node, the log information transmitted by the second node, and the log information transmitted by the third node, to obtain that a quantity of times the first node initiates the first transaction to the second node is L and that a quantity of times the first node initiates the first transaction to the third node is M, L and M being integers greater than or equal to 1; and the load balancing node determines the second node in response to that L is greater than M, and determines the first data by using the second route assignment table based on the first primary key ID.

In this embodiment, the load balancing system further includes the third node, and the log information transmitted by the first node further includes the first transaction ID and the first primary key ID. Based on this, the load balancing node receives the log information transmitted by the second node and the log information transmitted by the third node. In certain embodiment(s), the log information transmitted by the second node includes the first transaction ID and the first primary key ID, and the log information transmitted by the third node includes the first transaction ID and the first primary key ID. Thus, it can be seen that the first node, the second node and the third node all have processed the first transaction indicated by the first transaction ID, and steps related to the first data indicated by the first primary key ID are performed during data processing in a process of processing the first transaction.

Further, the load balancing node collects statistics on the log information transmitted by the first node, the log information transmitted by the second node, and the log information transmitted by the third node, to obtain that the quantity of times the first node initiates the first transaction to the second node is L and that the quantity of times the first node initiates the first transaction to the third node is M, L and M being integers greater than or equal to 1. If L is greater than M, it indicates that the first node processes the 2PC transaction for more times than the second node. Therefore, the second node is determined as a node capable of receiving migrated data. Then, after data of the 2PC transaction is migrated to the second node, a quantity of interactions for the 2PC transaction between the first node and the second node may be reduced by L.

Exemplarily, the quantity of times the first node initiates the first transaction to the second node is 100, and the quantity of times the first node initiates the first transaction to the third node is 50. If all data related to the first transaction in the first node is migrated to the third node, 50 interactions for the data between the first node and the third node may be reduced, but 100 interactions for the data between the first node and the second node may not be reduced. Therefore, if all the data related to the first transaction in the first node is migrated to the second node, the 100 interactions for the data between the first node and the second node may be reduced. Although the 500 interactions for the data between the first node and the third node may not be reduced, compared with the migration manner, this manner has the advantage that 2PC transactions are maximally reduced, thereby reducing a system load.

Second, this embodiment may also provide another method for determining to-be-migrated data. Refer back to FIG. 7. The load balancing node finds all edges crossing computing nodes in FIG. 7, calculates a difference between an amount of cross-node data processed by one data node and an amount of all data processed by the data node, and determines data requiring cross-node processing in a data node corresponding to a maximum difference as a first data interface. For example, for the data node G5 storing the data indicated by the primary key ID [100000001] in the node G1 in FIG. 7, an amount of all data processed by the data node G5 is 100, and an amount of cross-node data processed by the data node G5 is 25. Then, it may be obtained that a difference is 75 (100–25). For the data node G6 storing the data indicated by the primary key ID [075500567] in the node G3 in FIG. 7, an amount of all data processed by the data node G6 is 50, and an amount of cross-node data processed by the data node G6 is 49. Then, it may be obtained that a difference is 1 (50–49). Calculation may be performed for a data node in which each piece of cross-node data is in the system, and a node corresponding to a maximum difference is desired to migrate data in this node to another node. The corresponding data in the node is determined based on a transaction ID.

Figure 9:
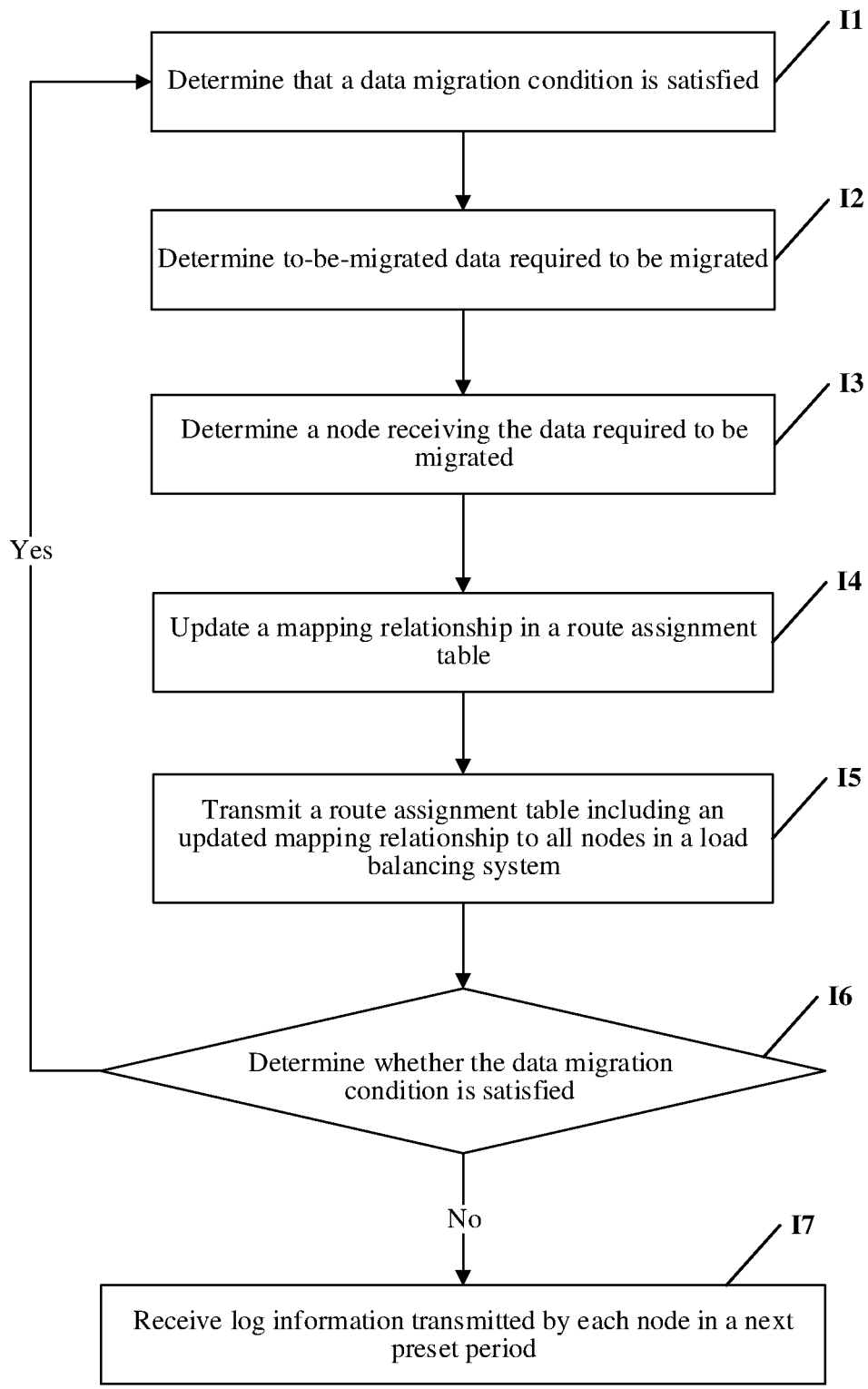
FIG. 9 is a schematic flowchart of determining to-be-migrated data according to certain embodiment(s) of the present disclosure.

For ease of understanding, refer to FIG. 9. FIG. 9 is a schematic flowchart of determining to-be-migrated data according to an embodiment of the present disclosure. As shown in FIG. 9, in step I1, log information transmitted by each node in a preset period is received in the manner described in the embodiments to determine that there is a node desired to perform data migration, that is, determine that the data migration condition is satisfied. In step I2, to-be-migrated data desired to be migrated is determined by using the method in this embodiment. In step I3, a plurality of nodes capable of processing the to-be-migrated data are determined, and a node receiving the data desired to be migrated is determined by using the method in this embodiment. Then, in step I4, a mapping relationship in a route assignment table is updated. In step I5, a route assignment table including an updated mapping relationship is transmitted to all nodes in the load balancing system, such that the node performs data migration based on the route assignment table including the updated mapping relationship. A method for data migration between the nodes is similar to that described in the embodiments, and will not be elaborated herein. Then, in step I6, the load balancing node is desired to redetermine whether the data migration condition is satisfied. If the data migration condition is satisfied, steps similar to step I1 to step I4 are performed; or if the data migration condition is not satisfied, step I7 is performed. That is, the load balancing node receives log information transmitted by each node in a next preset period, and processes the log information based on a manner similar to that in the embodiments. It is to be understood that the example in FIG. 9 is used to understand this solution, and a process and implementation steps are desired to be flexibly adjusted according to an actual situation.

This embodiment of the present disclosure provides another data migration method. In the manner, quantities of 2PC transactions processed by different nodes are determined based on quantities of times the nodes process data in the same transaction, a node that processes a larger amount of data of 2PC transactions is determined as a node desired to migrate data, and data that may be migrated on this node is determined based on a transaction ID. In this way, 2PC transactions are maximally reduced, thereby improving the load balancing effect, that is, improving reliability of data migration in this solution.

In certain embodiment(s), based on the embodiment corresponding to FIG. 4, in an embodiment of the data migration method provided in this embodiment of the present disclosure, the data migration condition is that a node fails.

The load balancing system further includes a third node.

The operation of determining that a data migration condition is satisfied includes:

the load balancing node determines, in response to that the first node does not transmit log information of the first node to the load balancing node in a first preset period, that the data migration condition is satisfied.

The data migration method further includes that:

the load balancing node receives, in the first preset period, log information transmitted by the second node and log information transmitted by the third node, the log information transmitted by the second node including the first transaction ID and the first primary key ID, and the log information transmitted by the third node including the first transaction ID and the first primary key ID.

That the load balancing node determines the first data and the second node includes that:

the load balancing node obtains a partition ID set corresponding to the first node, the partition ID set corresponding to the first node including the first partition ID;

the load balancing node obtains, based on the partition ID set corresponding to the first node, a primary key ID set corresponding to the first node, the primary key ID set corresponding to the first node including the first primary key ID; and the load balancing node determines the first data and the second node based on the first primary key ID, the first transaction ID, the log information transmitted by the second node, and the log information transmitted by the third node.

In this embodiment, the data migration condition is that a node fails. Based on this, if the load balancing node does not receive, in the first preset period, the log information of the first node transmitted by the first node, that is, the first node may fail, and cannot generate the corresponding log information, it is determined that the data migration condition is satisfied. Second, if the load balancing node can receive, in the first preset period, the log information transmitted by the second node and the log information transmitted by the third node, it indicates that the second node and the third node are both nodes that operate normally. In certain embodiment(s), the log information transmitted by the second node includes the first transaction ID and the first primary key ID, and the log information transmitted by the third node includes the first transaction ID and the first primary key ID.

Further, the load balancing node obtains the partition ID set corresponding to the first node. In certain embodiment(s), the partition ID set corresponding to the first node includes the first partition ID. Then, the primary key ID corresponding to the first node is obtained based on the partition ID set corresponding to the first node. In certain embodiment(s), the primary key ID set corresponding to the first node includes the first primary key ID. Then, the first data and the second node may be determined based on the first primary key ID, the first transaction ID, the log information transmitted by the second node, and the log information transmitted by the third node. The load balancing node is prevented from considering the failing node as a node capable of bearing data, thereby improving reliability of this solution. The following describes how to determine the first data and the second node based on the information.

In certain embodiment(s), based on the embodiment corresponding to FIG. 4, in an embodiment of the data migration method provided in this embodiment of the present disclosure, that the load balancing node determines the first data and the second node based on the first transaction ID, the log information transmitted by the second node, and the log information transmitted by the third node includes that:
  the load balancing node determines, by using the second route assignment table, the first data based on the first primary key ID;
  the load balancing node collects statistics on the log information transmitted by the second node and the log information transmitted by the third node, to obtain that a quantity of times the second node initiates the first transaction is Q and that a quantity of times the third node initiates the first transaction is P, Q and P being integers greater than or equal to 1; and
  the load balancing node determines the second node in response to that Q is greater than P, and determines the first data by using the second route assignment table based on the first primary key ID.

In this embodiment, since the first node is a failing node, data born in the first node is all data desired to be migrated. Therefore, the load balancing node determines, by using the second route assignment table, the first data based on the first primary key ID. Second, the load balancing node collects, in a manner similar to that in the embodiments, statistics on the log information transmitted by the second node and the log information transmitted by the third node, to obtain that the quantity of times the second node initiates the first transaction is Q and that the quantity of times the third node initiates the first transaction is P, Q and P being integers greater than or equal to 1. When Q is greater than P, it indicates that a quantity of data interactions performed by the second node is larger. Therefore, the load balancing node determines the second node as a node capable of bearing the first data.

In certain embodiment(s), the load balancing node may add a node to migrate the data on the failing first node to the new node, and then update the route assignment table, such that the corresponding data may be processed by the new node. This manner is similar to the manner of initializing the route assignment table, and updating a related mapping of the partition ID is also similar to that described in the embodiments. Therefore, this is not limited herein.

This embodiment of the present disclosure provides another data migration method. In the manner, when a node fails, data on the failing node is all desired to be migrated. A node to which each piece of data may be migrated is determined based on a mapping relationship between a primary key ID of each piece of data and a transaction ID, and a node that processes fewer 2PC transactions is determined, based on quantities of times different nodes process data in a transaction, as a node capable of receiving the data. After the node obtains the migrated data, a hotspot or a system load imbalance is avoided. Therefore, the load balancing effect is improved.

In certain embodiment(s), based on the embodiment corresponding to FIG. 4, in an embodiment of the data migration method provided in this embodiment of the present disclosure, that the load balancing node obtains a second route assignment table includes that: the load balancing node obtains a first primary key ID set, the first primary key ID set including a plurality of primary key IDs, and one primary key ID being used for uniquely identifying the first data;
  the load balancing node divides the first primary key ID set into S second primary key ID sets, each primary key ID in the second primary key ID set being managed by a same node, and S being an integer greater than or equal to 1;
  the load balancing node assigns the S second primary key IDs to S nodes;
  the load balancing node determines, from the S nodes, the first node managing a third primary key ID set, the third primary key ID set including the first primary key ID;
  the load balancing node obtains a partition ID set corresponding to the first node;
  the load balancing node determines, from the partition ID set, the second partition ID corresponding to the first data; and
  the load balancing node establishes the mapping relationship between the first primary key ID and the second partition ID, and generates the first route assignment table.

In this embodiment, how the load balancing node obtains the second route assignment table through initialization is described. For ease of understanding, partitioning modes in this solution are first described. The first is user-specified partitioning. The second is load-balancing-based partitioning. The following describes the two partitioning modes respectively.

1: User-Specified Partitioning

User-specified partitioning is not desired to specify a partition ID for each user table, that is, determine a partition ID for each column of data in a user table of a user. The user notifies the load balancing node of a transaction assignment logic in advance, such that the load balancing node may perform load balancing most efficiently. For example, if the user is a numerical information account, the user may specify partitioning to be performed according to a province in which the numerical information account. In certain embodiment(s), data of numerical information accounts in the same province is all be managed by a same node. It is generally considered that most transactions related to numerical information may be directly executed in numerical information accounts in the same province. In this way, taking the province as a partition ID may implement load balancing processing well.

2: Load-Balancing-Based Partitioning

Load-balancing-based partitioning is desired to be based on a primary key ID corresponding to each piece of data, and is a partitioning mode in which a ratio of a throughput of the 2PC transaction in the entire system is specified based on a running effect of load balancing and adjustment is performed according to the ratio. Since transaction processing is generally recorded based on the primary key ID corresponding to each piece of data, a node in which data is or a transaction corresponding to the data may be determined by using a mapping relationship during running in a transaction dimension.

In certain embodiment(s), a user-specified parameter "USER_SPECIFIED_PARITITON_KEYS" is used for indicating that the user specifies a mapping relationship between a primary key ID and a partition ID, and a load balancing parameter "USER_SPECIFIED_ALGORITHM" is used for instructing partitioning to be performed based on load balancing. Therefore, when the load balancing system is started, a program may detect whether there is the user-specified parameter "USER_SPECIFIED_PARITI- TON_KEYS". If there is the user-specified parameter "USER_SPECIFIED_PARITITON_KEYS", partitioning is performed in the user-specified partitioning mode, thereby establishing the mapping relationship between the primary key ID and the partition ID, and generating the second route assignment table, to perform initialization. Second, the program may also detect whether there is the load balancing parameter "USER_SPECIFIED_ALGORITHM". If there is the load balancing parameter "USER_SPECIFIED_ALGO- RITHM", partitioning is performed in the load-balancing- based partitioning mode. The following describes in detail how to perform partitioning based on load balancing.

The load balancing node obtains the first primary key ID set. The first primary key ID set includes the plurality of primary key IDs. One primary key ID is used for uniquely identifying the first data. In general, in the initialization scenario, a node is used for the first time and data is imported, the node performs data migration, or the like. In certain embodiment(s), the load balancing system has started importing the data, and each piece of data corresponds to a primary key ID uniquely identifying the data. Therefore, primary key IDs corresponding to all data may be obtained, and the first primary key ID set including the plurality of primary key IDs is further obtained. Then, the load balancing node is desired to determine how many nodes are available in the load balancing system, and then equally divides the first primary key ID set into a corresponding quantity of second primary key ID sets. Based on this, the load balancing node divides the first primary key ID set into the S second primary key ID sets. Each primary key ID in the second primary key ID set is managed by a same node. S is an integer greater than or equal to 1. Then, the load balancing node assigns the S second primary key ID sets to the S nodes, such that each node may manage the data identified by a plurality of primary key IDs in the second primary key ID set.

Establishment of the mapping relationship between the first primary key ID and the second partition ID is used as an example. A second primary key ID set including the first primary key ID may be first determined from the S second primary key ID sets. The second primary key ID set including the first primary key ID is determined as the third primary key ID set. Since the S second primary key ID sets are assigned to the S nodes, the first node managing the third primary key ID set may further be determined. Further, the load balancing node obtains a partition ID set corresponding to the first node, and determines the second partition ID corresponding to the first data from partition IDs which are in the partition ID set corresponding to the first node and for which mapping relationships are not established. It is to be understood that, after this step is performed, mapping relationships cannot be established between other data and the second partition ID, unless the first data no longer corresponds to the second partition ID. Then, the load balancing node may establish the mapping relationship between the first primary key ID and the second partition ID. It is to be understood that, for another data ID, a mapping relationship between a primary key ID and a partition ID may also be established in a similar manner, thereby generating the second route assignment table.

Figure 10:
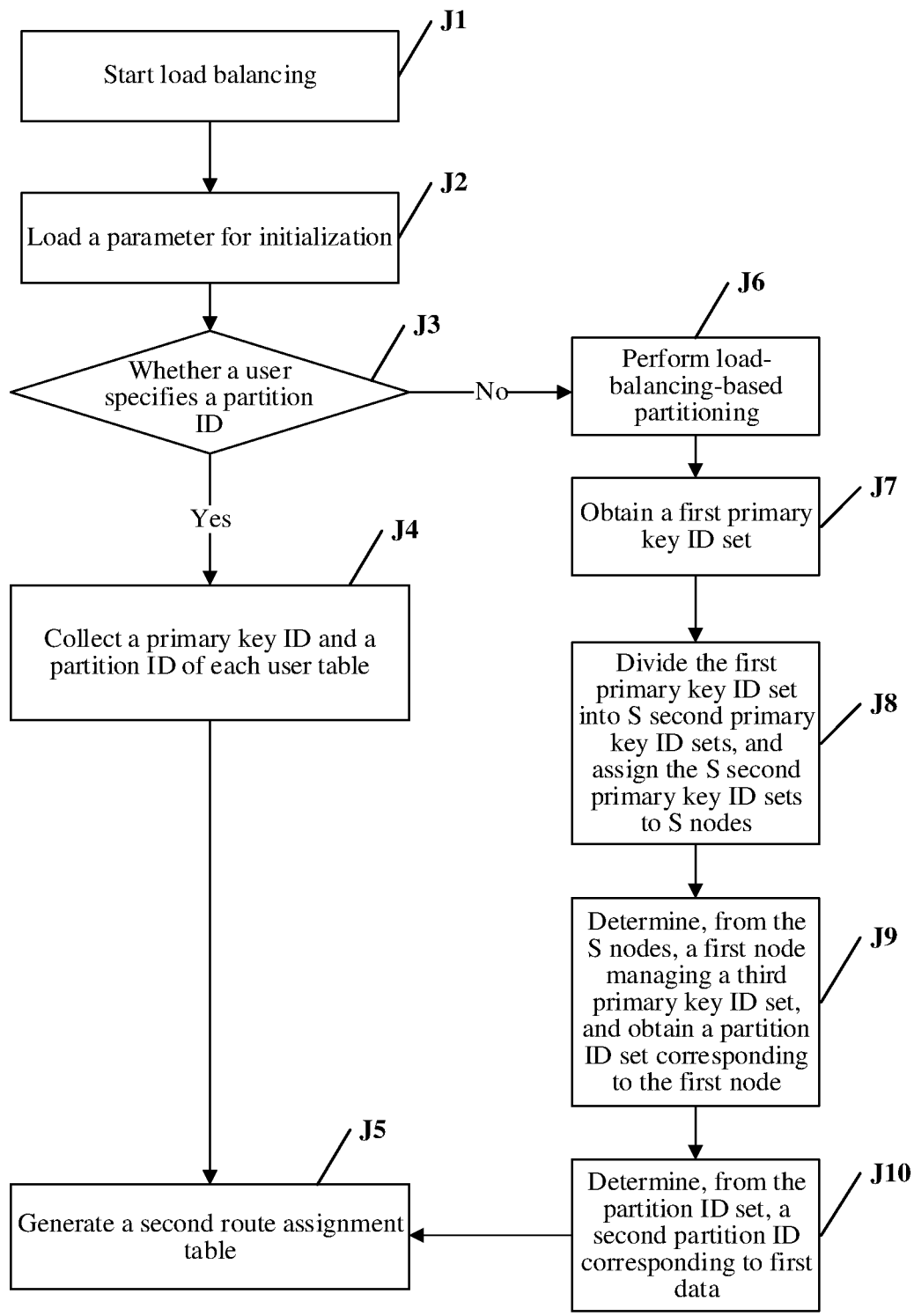
FIG. 10 is a schematic flowchart of obtaining a second route assignment table according to certain embodiment(s) of the present disclosure.

In certain embodiment(s), all the data imported in the system is processed as above, thereby generating the second route assignment table. The second route assignment table includes mapping relationships between primary key IDs of all the data and partition IDs. The following describes, in detail based on FIG. 10, how to obtain the route assignment table through initialization, so as to further understand the initialization steps in this solution. FIG. 10 is a schematic flowchart of obtaining the second route assignment table according to an embodiment of the present disclosure. As shown in FIG. 10, in step J1, load balancing is started. In a scenario in which load balancing is started and initialization is desired, the node is used for the first time and the data is imported, or the node performs data migration. This is not limited herein. In step J2, a corresponding parameter is loaded for initialization, that is, input of the parameter corresponding to the load balancing node is performed, and an initialization phase is entered. Input of the parameter may include inputting the load balancing parameter "USER_SPECIFIED_ALGORITHM" or the user-specified parameter "USER_SPECIFIED_PARITITON_KEYS". It is to be understood that the input parameter in this embodiment necessarily includes "USER_SPECIFIED_ALGORITHM", but does not necessarily include "USER_SPECIFIED_PAR- ITITON_KEYS". In step J3, whether the user specifies the partition ID is determined, that is, whether the user-specified parameter "USER_SPECIFIED_PARITITON_KEYS" may be detected is determined. If the user-specified parameter "USER_SPECIFIED_PARITITON_KEYS" may be detected, it is determined that the user specifies the partition ID, and step J4 is performed. In step J4, a primary key ID and a partition ID of each user table are collected, and consistent hash division is performed on the partition IDs according to node values corresponding to the nodes to obtain a node indicated by each partition ID. After ID information of all user tables is collected, mapping relationships are established based on the primary key ID and the partition ID of each user table. Therefore, in step J5, the second route assignment table is generated.

If the user-specified parameter "USER_ SPECIFIED_PARITITON_KEYS" may not be detected, it is determined that the user does not specify the partition ID, and step J6 is performed. In step J6, load-balancing-based partitioning is started. In certain embodiment(s), a related data structure is first initialized. Partition information is initialized for each user table, and statistical primary key information is collected for each user table. Therefore, in step J7, the first primary key ID set is obtained. For more ease of understanding this solution, the following uses establishment of the mapping relationship between the first primary key ID and the second partition ID as an example for description. Based on this, in step J8, the first primary key ID set is divided into the S second primary key ID sets, and the S second primary key ID sets are assigned to the S nodes. In step J9, the first node managing the third primary key ID set is determined from the S nodes, and the partition ID set corresponding to the first node is obtained. Based on this, in step J10, the second partition ID corresponding to the first data is determined from the partition ID set. Processing of steps J8 to J10 is performed on each row of data in each user table, and then the mapping relationships between the primary key IDs and the partition IDs are established. In this way, the second route assignment table may be generated in step J5.

It is to be understood that the example in FIG. 10 is used to explain a process in which the route assignment table is obtained through initialization, and is not to be understood as a limitation on a process in this solution. Second, a implementation has been described in the embodiments, and will not be elaborated herein.

This embodiment of the present disclosure provides a method for obtaining the route assignment table through initialization. In the manner, the route assignment table is obtained in different initialization manners. Therefore, feasibility and flexibility of this solution are improved.

In certain embodiment(s), based on the embodiment corresponding to FIG. 4, in an embodiment of the data migration method provided in this embodiment of the present disclosure, that the load balancing node obtains a second route assignment table includes that:

the load balancing node obtains a third route assignment table;

the load balancing node receives a data addition instruction, the data addition instruction carrying the mapping relationship between the first primary key ID and the second partition ID;

the load balancing node obtains the mapping relationship between the first primary key ID and the second partition ID according to the data addition instruction; and the load balancing node adds the mapping relationship between the first primary key ID and the second partition ID to the third route assignment table to obtain the first route assignment table.

In this embodiment, the load balancing node obtains the third route assignment table. The third route assignment table may be a route assignment table obtained through initialization, or a route assignment table obtained by updating the mapping relationship. This is not limited herein. When there is a new user account getting on-line, and there is related data of a new transaction is desired to be added, the load balancing node receives the data addition instruction. A user table is desired to be created for the new user account. The user table includes a plurality of primary key IDs corresponding to the related data of the new transaction and nodes to which the related data of the new transaction is specified by the user to belong to in the user table (that is, partition IDs are obtained). If the related data of the new transaction includes the first data, the data addition instruction carries the mapping relationship between the first primary key ID and the second partition ID. Clearly, the load balancing node may obtain the mapping relationship between the first primary key ID and the second partition ID according to the data addition instruction, and add the mapping relationship between the first primary key ID and the second partition ID to the third route assignment table to obtain the first route assignment table. That is, the related data of the new transaction is added by using mapping relationships between the primary key IDs and the partition IDs that are specified by the user.

Alternatively, if the user does not specify the mapping relationships, the load balancing node may assign the related data of the new transaction for uniform addition and distribution to different nodes. Then, the existing third route assignment table is initialized in a manner similar to the foregoing. In this way, the first route assignment table may be obtained.

In certain embodiment(s), based on the embodiment corresponding to FIG. 4, in an embodiment of the data migration method provided in this embodiment of the present disclosure, that the load balancing node obtains a second route assignment table includes that:

the load balancing node obtains a fourth route assignment table, the fourth route assignment table including a mapping relationship between a second primary key ID and the first partition ID;

the load balancing node receives a data deletion instruction, the data deletion instruction carrying the second primary key ID;

the load balancing node obtains the second primary key ID according to the data deletion instruction;

the load balancing node determines, from the fourth route assignment table, the mapping relationship between the second primary key ID and the first partition ID based on the second primary key ID; and the load balancing node deletes the mapping relationship between the second primary key ID and the first partition ID in the fourth route assignment table to obtain the second route assignment table.

In this embodiment, the load balancing node obtains the fourth route assignment table. The fourth route assignment table includes the mapping relationship between the second primary key ID and the first partition ID. The fourth route assignment table may be a route assignment table obtained through initialization, or a route assignment table obtained by updating the mapping relationship. This is not limited herein. When a user gets off-line, or the user stops a transaction, the load balancing node receives the data deletion instruction. The data deletion instruction carries the second primary key ID. The second primary key ID indicates data in the transaction that the user is desired to stop. Clearly, the load balancing node may obtain the second primary key ID according to the data deletion instruction, determine, from the fourth route assignment table, the mapping relationship between the second primary key ID and the first partition ID based on the second primary key ID, and delete the mapping relationship between the second primary key ID and the first partition ID in the fourth route assignment table to obtain the second route assignment table. Then, the second route assignment table no longer includes the mapping relationship.

It is to be understood that since one transaction may include a plurality of pieces of data, when the user stops a transaction, all mapping relationships corresponding to the plurality of pieces in the transaction in the route assignment table are deleted in a manner similar to the foregoing.

It is to be understood that when receiving the data addition instruction or the data deletion instruction, a node in the load balancing system may update the route assignment table by using its own computing capability, to perform addition or deletion of a mapping relationship. However, the node is also desired to transmit an updated route assignment table to another node to enhance consistency of the route assignment table in the load balancing system.

This embodiment of the present disclosure provides another method for obtaining the second route assignment table. In the manner, the mapping relationship in the existing route assignment table may be updated by using the data addition instruction or the data deletion instruction. In this way, when a transaction and corresponding data in the load balancing system are updated in real time, it is more ensured that an obtained route assignment table can more accurately reflect a mapping relationship between a primary key ID and a partition ID of each piece of data, thereby ensuring data processing accuracy of each node.

Figure 11:
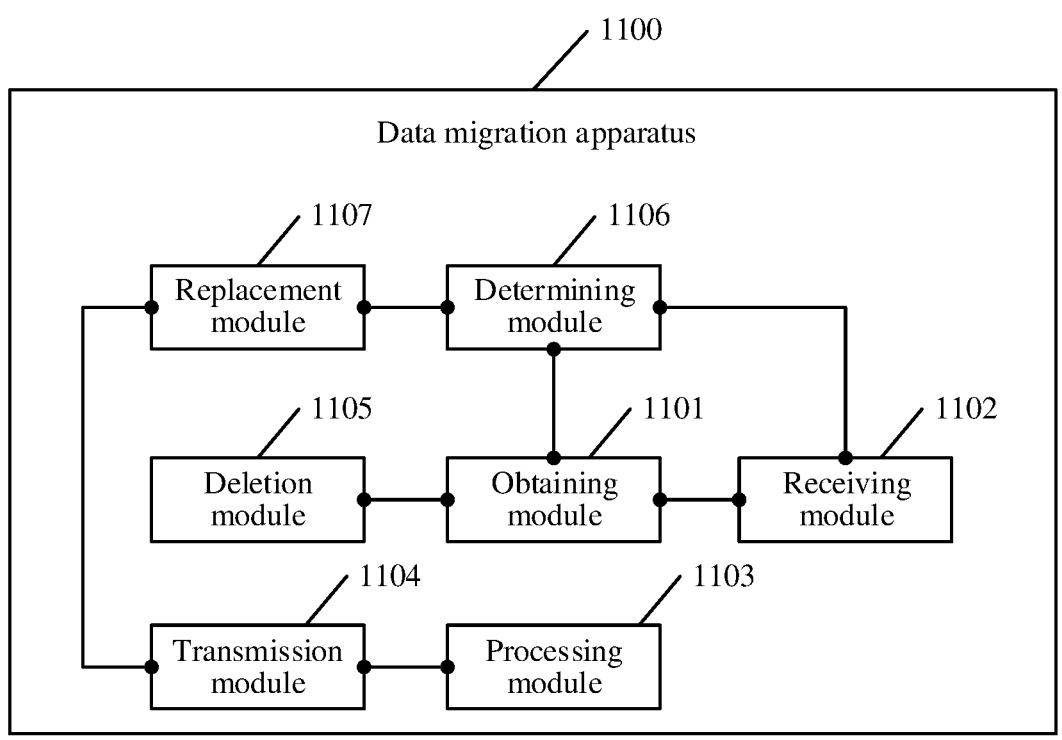
FIG. 11 is a schematic diagram of a structure of a data migration apparatus according to certain embodiment(s) of the present disclosure.

The following describes a data migration apparatus in the present disclosure in detail. Refer to FIG. 11. FIG. 11 is a schematic diagram of a structure of the data migration apparatus according to an embodiment of the present disclosure. As shown in FIG. 11, the data migration apparatus 1100 includes:

an obtaining module 1101, configured to obtain a first route assignment table, the first route assignment table including a mapping relationship between a first primary key ID and a first partition ID, the first primary key ID being used for uniquely identifying first data, and the first partition ID indicating a second node;

a receiving module 1102, configured to receive a first instruction, the first instruction carrying the first primary key ID and a first transaction ID, the first transaction ID indicating a first transaction, and a first node being configured to process the first transaction;

the obtaining module 1101 being further configured to obtain, by using the first route assignment table, the first partition ID based on the first primary key ID carried in the first instruction;

a processing module 1103, configured to determine the second node based on the first partition ID, the second node being configured to process the first transaction; and a transmission module 1104, configured to transmit the first data to the second node.

In certain embodiment(s), based on the embodiment corresponding to FIG. 11, the first route assignment table further includes a mapping relationship between a first index ID and the first partition ID.

The first instruction further includes the first index ID.

The obtaining module 1101 is configured to: determine, by using the first route assignment table, N partition IDs based on the first index ID carried in the first instruction, the N partition IDs including the first partition ID, and N being an integer greater than or equal to 1; and determine, by using the first route assignment table, the first partition ID from the N partition IDs based on the first primary key ID carried in the first instruction.

In certain embodiment(s), based on the embodiment corresponding to FIG. 11, the data migration apparatus 1100 further includes a deletion module 1105.

The obtaining module 1101 is further configured to obtain a second route assignment table at a first time point, the second route assignment table including a mapping relationship between the first primary key ID and a second partition ID, and the second partition ID indicating the first node.

The obtaining module 1101 is configured to obtain the first route assignment table at a second time point, the second time point being later than the first time point.

The deletion module 1105 is configured to delete the second route assignment table after the transmission module transmits the first data uniquely identified by the first primary key ID to the second node.

In certain embodiment(s), based on the embodiment corresponding to FIG. 11, the data migration apparatus 1100 further includes a determining module 1106 and a replacement module 1107.

The obtaining module 1101 is further configured to obtain a second route assignment table, the second route assignment table including a mapping relationship between the first primary key ID and a second partition ID, the second partition ID indicating the first node, and the first node being configured to process the first transaction.

The determining module 1106 is configured to determine the first data and the second node in response to determining that a data migration condition is satisfied, the first data being data desired to be migrated to the second node.

The replacement module 1107 is configured to replace the second partition ID in the second route assignment table with the first partition ID to obtain the first route assignment table, the first partition ID being used for uniquely identifying the second node.

The transmission module 1104 is further configured to transmit the first route assignment table to the first node and the second node.

In certain embodiment(s), based on the embodiment corresponding to FIG. 11, the data migration condition is that a ratio of a 2PC transaction processing throughput to a total transaction processing throughput of a node is greater than the first preset threshold.

The determining module 1106 is configured to: obtain a 2PC transaction ID in response to that log information transmitted by the first node is received in a first preset period, the log information transmitted by the first node including the 2PC transaction ID, and the 2PC transaction ID indicating that the log information is generated after the first node processes a 2PC transaction;

statistically obtain a total transaction processing throughput of the first node based on the log information transmitted by the first node;

statistically obtain a 2PC transaction processing throughput of the first node based on the 2PC transaction ID; and determine, in response to that a ratio of the 2PC transaction processing throughput of the first node to the total transaction processing throughput of the first node is greater than the first preset threshold, that the data migration condition is satisfied.

In certain embodiment(s), based on the embodiment corresponding to FIG. 11, the data migration condition is that total memory usage of a node is greater than a second preset threshold.

The determining module 1106 is configured to: receive, in a second preset period, total memory usage of the first node transmitted by the first node, the total memory usage indicating a memory resource occupied by a plurality of transactions processed by the first node; and determine, in response to that the total memory usage of the first node is greater than the second preset threshold, that the data migration condition is satisfied.

In certain embodiment(s), based on the embodiment corresponding to FIG. 11, the log information transmitted by the first node further includes the first transaction ID and the first primary key ID.

The receiving module 1102 is further configured to receive log information transmitted by the second node and log information transmitted by a third node, the log information transmitted by the second node including the first transaction ID and the first primary key ID, and the log information transmitted by the third node including the first transaction ID and the first primary key ID.

The determining module 1106 is configured to: collect statistics on the log information transmitted by the first node, the log information transmitted by the second node, and the log information transmitted by the third node, to obtain that a quantity of times the first node initiates the first transaction to the second node is L and that a quantity of times the first node initiates the first transaction to the third node is M, L and M being integers greater than or equal to 1; and determine the second node in response to that L is greater than M, and determine the first data by using the second route assignment table based on the first primary key ID.

In certain embodiment(s), based on the embodiment corresponding to FIG. 11, the data migration condition is that a node fails.

The determining module 1106 is configured to determine, in response to that the first node does not transmit log information of the first node to a load balancing node in a first preset period, that the data migration condition is satisfied.

The receiving module 1102 is further configured to receive, in the first preset period, log information transmitted by the second node and log information transmitted by a third node, the log information transmitted by the second node including the first transaction ID and the first primary key ID, and the log information transmitted by the third node including the first transaction ID and the first primary key ID.

The determining module 1106 is configured to: obtain a partition ID set corresponding to the first node, the partition ID set corresponding to the first node including the first partition ID;

obtain, based on the partition ID set corresponding to the first node, a primary key ID set corresponding to the first node, the primary key ID set corresponding to the first node including the first primary key ID; and determine the first data and the second node based on the first primary key ID, the first transaction ID, the log information transmitted by the second node, and the log information transmitted by the third node.

In certain embodiment(s), based on the embodiment corresponding to FIG. 11, the determining module 1106 is configured to: determine, by using the second route assignment table, the first data based on the first primary key ID;

collect statistics on the log information transmitted by the second node and the log information transmitted by the third node, to obtain that a quantity of times the second node initiates the first transaction is Q and that a quantity of times the third node initiates the first transaction is P, Q and P being integers greater than or equal to 1; and determine the second node in response to that Q is greater than P, and determine the first data by using the second route assignment table based on the first primary key ID.

In certain embodiment(s), based on the embodiment corresponding to FIG. 11, the obtaining module 1101 is configured to: obtain a first primary key ID set, the first primary key ID set including a plurality of primary key IDs, and one primary key ID being used for uniquely identifying the first data;

divide the first primary key ID set into S second primary key ID sets, each primary key ID in the second primary key ID set being managed by a same node, and S being an integer greater than or equal to 1;

assign the S second primary key IDs to S nodes;

determine, from the S nodes, the first node managing a third primary key ID set, the third primary key ID set including the first primary key ID;

obtain a partition ID set corresponding to the first node;

determine, from the partition ID set, the second partition ID corresponding to the first data; and establish the mapping relationship between the first primary key ID and the second partition ID, and generate the first route assignment table.

In certain embodiment(s), based on the embodiment corresponding to FIG. 11, the obtaining module 1101 is configured to: obtain a third route assignment table;

receive a data addition instruction, the data addition instruction carrying the mapping relationship between the first primary key ID and the second partition ID;

obtain the mapping relationship between the first primary key ID and the second partition ID according to the data addition instruction; and add the mapping relationship between the first primary key ID and the second partition ID to the third route assignment table to obtain the first route assignment table.

In certain embodiment(s), based on the embodiment corresponding to FIG. 11, the obtaining module 1101 is configured to: obtain a fourth route assignment table, the fourth route assignment table including a mapping relationship between a second primary key ID and the first partition ID;

receive a data deletion instruction, the data deletion instruction carrying the second primary key ID;

obtain the second primary key ID according to the data deletion instruction;

determine, from the fourth route assignment table, the mapping relationship between the second primary key ID and the first partition ID based on the second primary key ID; and delete the mapping relationship between the second primary key ID and the first partition ID in the fourth route assignment table to obtain the second route assignment table.

Figure 12:
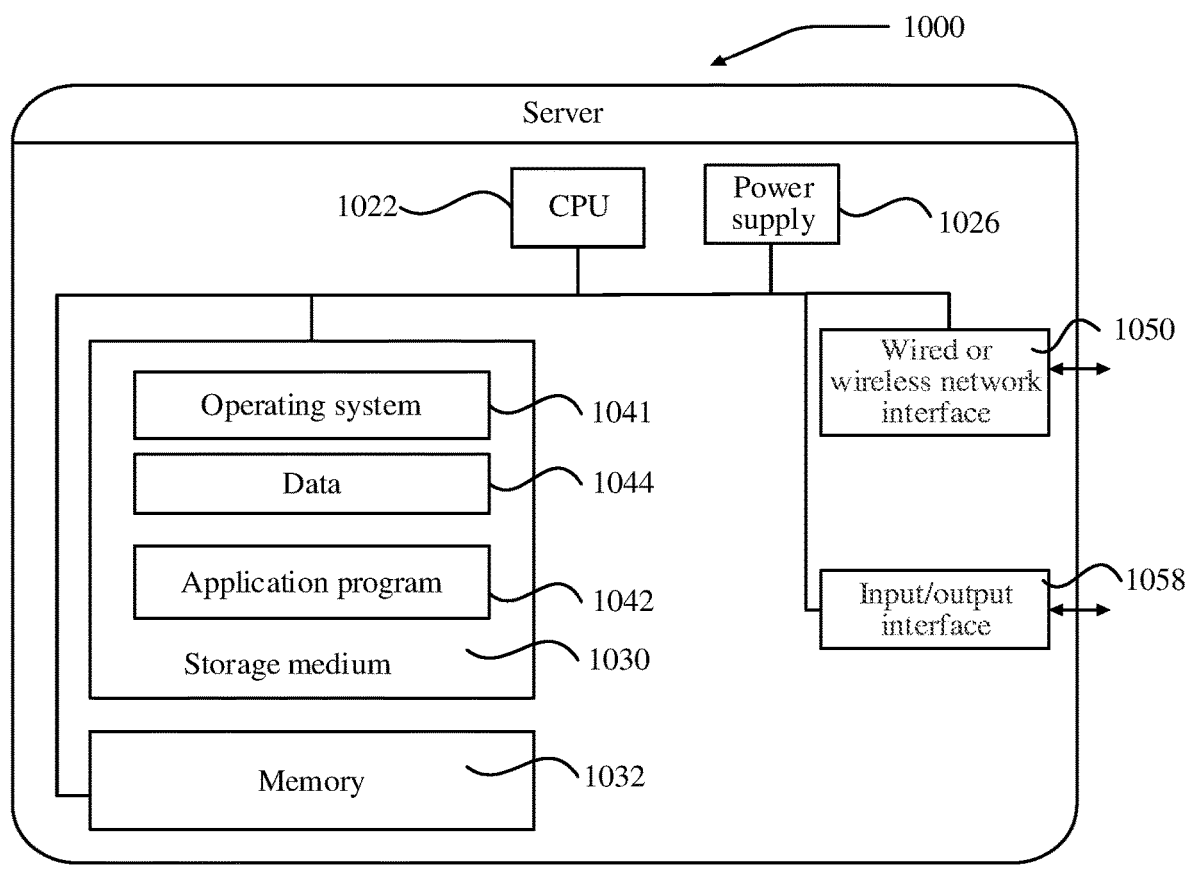
FIG. 12 is a schematic diagram a server according to certain embodiment(s) of the present disclosure.

An embodiment of the present disclosure also provides another data migration apparatus. An example in which the data migration apparatus is deployed in a server is used in the present disclosure for description. Refer to FIG. 12. FIG. 12 is a schematic diagram of an embodiment of a server according to an embodiment of the present disclosure. As shown in this figure, the server 1000 may differ greatly in scenario of different configurations or performance. It may include one or more central processing units (CPUs) 1022 (for example, one or more processors) and memories 1032, and one or more storage media 1030 (for example, one or more mass storage devices) that store application programs 1042 or data 1044. The memory 1032 and the storage medium 1030 may implement temporary storage or persistent storage. The program stored in the storage medium 1030 may include one or more modules (not shown in the figure), each of which may include a series of instruction operations in the server. Furthermore, the CPU 1022 may be configured to communicate with the storage medium 1030 to execute, on the server 1000, the series of instruction operations in the storage medium 1030.

The server 1000 may further include one or more power supplies 1026, one or more wired or wireless network interfaces 1050, one or more input/output interfaces 1058, and/or one or more operating systems 1041, for example, Windows Server™, Mac OS X™ Unix™, Linux™, and FrEBSD™.

The steps performed by the server in the embodiments may be based on the structure of the server shown in FIG. 12.

The CPU 1022 of the server is configured to execute the embodiment shown in FIG. 4 and each embodiment corresponding to FIG. 4.

An embodiment of the present disclosure also provides a computer-readable storage medium. The computer-readable storage medium stores a computer program which, when run in a computer, enables the computer to perform the steps performed by a node of the server or the load balancing node in the method described in the embodiment shown in FIG. 4 and the method described in each embodiment corresponding to FIG. 4.

An embodiment of the present disclosure also provides a computer program product including a program. The computer program product, when run in a computer, enables the computer to perform the steps performed by a node of the server or the load balancing node in the method described in the embodiment shown in FIG. 4.

A person skilled in the art may clearly learn that for ease and brevity of description, working processes of the system, apparatus, and unit may refer to the corresponding processes in the method embodiment, and will not be elaborated herein.

In some embodiments provided in the present disclosure, it is to be understood that the disclosed system, apparatus, and method may be implemented in another manner. For example, the apparatus embodiment described above is merely schematic. For example, division of the units is merely a logic function division, and other division manners may be used in actual implementations. For example, a plurality of units or components may be combined or integrated into another system, or some characteristics may be neglected or not executed. In addition, coupling or direct coupling or communication connection between displayed or discussed components may be indirect coupling or communication connection, implemented through some interfaces, of the apparatus or the units, and may be electrical and mechanical or use other forms.

The units described as separate parts may or may not be physically separated. Parts displayed as units may or may not be physical units, that is, may be located in the same place or distributed to a plurality of network units. Some or all of the units may be selected as actually desired to achieve an objective of the solution of this embodiment.

In addition, each function unit in each embodiment of the present disclosure may be integrated into a processing unit. Alternatively, each unit may physically exist independently. Alternatively, two or more than two units may be integrated into a unit. The integrated unit may be implemented in a hardware form or in a form of a software function unit.

When implemented in the form of the software function unit and sold or used as an independent product, the integrated unit may be stored in a computer-readable storage medium. Based on such an understanding, the technical solutions of the present disclosure make contribution to the technical art, and all or part of the technical solutions may be embodied in a form of a software product. The computer software product is stored in a storage medium, including a plurality of instructions for enabling a computing device (which may be a personal computer, a server, a network device, or the like) to perform all or some of the steps in the method as described in each embodiment of the present disclosure. The storage medium includes various media capable of storing program code, for example, a USB flash drive, a mobile hard disk, a read-only memory (ROM), a random access memory (RAM), a magnetic disk, or an optical disk.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

The above embodiment is used not to limit but to describe the technical solutions of the present disclosure. Although the present disclosure is described in detail with reference to the embodiments, it is to be understood by a person of ordinary skill in the art that modifications may still be made to the technical solutions described in the embodiments, or equivalent replacements may be made to some technical features. Essences of corresponding technical solutions obtained by these modifications or replacements are kept within a spirit and a scope of the technical solution of each embodiment of the present disclosure.

What is claimed is:

1. A data migration method, applied to a load balancing system including a first node, a second node, and a load balancing node, the method comprising:
    obtaining, by the first node, a first route assignment table, the first route assignment table including a mapping relationship between a first primary key identity (ID) and a first partition ID, the first primary key ID uniquely identifying first data, and the first partition ID uniquely identifying the second node;
    receiving, by the first node, a first instruction, the first instruction carrying the first primary key ID and a first transaction ID, the first transaction ID indicating a first transaction, and the first node being configured to process the first transaction;
    obtaining, by the first node by using the first route assignment table, the first partition ID based on the first primary key ID carried in the first instruction;
    determining, by the first node, the second node based on the first partition ID, the second node being configured to process the first transaction; and
    transmitting, by the first node, the first data to the second node,
    wherein the first route assignment table is obtained by:
        obtaining, by the load balancing node, a second route assignment table, the second route assignment table including a mapping relationship between the first primary key ID and a second partition ID, and the second partition ID indicating the first node;
        determining, by the load balancing node, the first data and the second node in response to determining that a data migration condition is satisfied, the first data being data desired to be migrated to the second node;
        replacing, by the load balancing node, the second partition ID in the second route assignment table with the first partition ID to obtain the first route assignment table; and
        transmitting, by the load balancing node, the first route assignment table to the first node and the second node.

2. The method according to claim 1, wherein the first route assignment table further includes a mapping relationship between a first index ID and the first partition ID;
the first instruction further includes the first index ID; and
obtaining the first partition ID comprises:
    determining, by the first node by using the first route assignment table, N partition IDs based on the first index ID carried in the first instruction, the N partition IDs comprising the first partition ID, and N being an integer greater than or equal to 1; and
    determining, by the first node by using the first route assignment table, the first partition ID from the N partition IDs based on the first primary key ID carried in the first instruction.

3. The method according to claim 1, further comprising:
obtaining, by the first node, the second route assignment table at a first time point;
obtaining the first route assignment table comprises:
    obtaining, by the first node, the first route assignment table at a second time point, the second time point being later than the first time point; and the method further comprises:
deleting, by the first node, the second route assignment table.

4. The method according to claim 1, wherein the data migration condition is that a ratio of a two-phase commit (2PC) transaction processing throughput to a total transaction processing throughput of a node is greater than a first preset threshold; and
determining that the data migration condition is satisfied comprises:
obtaining, by the load balancing node, a 2PC transaction ID in response to that log information transmitted by the first node is received in a first preset period, the log information transmitted by the first node comprising the 2PC transaction ID, and the 2PC transaction ID indicating that the log information is generated after the first node processes a 2PC transaction;
obtaining, statistically by the load balancing node, a total transaction processing throughput of the first node based on the log information transmitted by the first node;
obtaining, statistically by the load balancing node, a 2PC transaction processing throughput of the first node based on the 2PC transaction ID; and
determining, by the load balancing node in response to that a ratio of the 2PC transaction processing throughput of the first node to the total transaction processing throughput of the first node is greater than the first preset threshold, that the data migration condition is satisfied.

5. The method according to claim 1, wherein the data migration condition is that total memory usage of a node is greater than a second preset threshold;
the data migration condition is determined to be satisfied by:
receiving, in a second preset period, total memory usage of the first node transmitted by the first node, the total memory usage indicating a memory resource occupied by a plurality of transactions processed by the first node; and
determining, by the load balancing node in response to that the total memory usage of the first node is greater than the second preset threshold, that the data migration condition is satisfied.

6. The method according to claim 1, wherein the load balancing system further includes a third node;
the log information transmitted by the first node further includes the first transaction ID and the first primary key ID;
the method further comprises:
receiving, by the load balancing node, log information transmitted by the second node and log information transmitted by the third node, the log information transmitted by the second node comprising the first transaction ID and the first primary key ID, and the log information transmitted by the third node comprising the first transaction ID and the first primary key ID; and
the determining, by the load balancing node, the first data and the second node comprises:
collecting, by the load balancing node, statistics on the log information transmitted by the first node, the log information transmitted by the second node, and the log information transmitted by the third node, to obtain that a quantity of times the first node initiates the first transaction to the second node is L and that a quantity of times the first node initiates the first transaction to the third node is M, L and M being integers greater than or equal to 1; and
determining, by the load balancing node, the second node in response to that L is greater than M, and determining the first data by using the second route assignment table based on the first primary key ID.

7. The method according to claim 1, wherein the data migration condition is that a node fails;
the load balancing system further includes a third node;
the data migration condition is determined to be satisfied by:
determining, by the load balancing node in response to that the first node does not transmit log information of the first node to the load balancing node in a first preset period, that the data migration condition is satisfied;
the method further comprises:
receiving, by the load balancing node in the first preset period, log information transmitted by the second node and log information transmitted by the third node, the log information transmitted by the second node comprising the first transaction ID and the first primary key ID, and the log information transmitted by the third node comprising the first transaction ID and the first primary key ID; and
the determining, by the load balancing node, the first data and the second node comprises:
obtaining, by the load balancing node, a partition ID set corresponding to the first node, the partition ID set corresponding to the first node comprising the first partition ID;
obtaining, by the load balancing node based on the partition ID set corresponding to the first node, a primary key ID set corresponding to the first node, the primary key ID set corresponding to the first node comprising the first primary key ID; and
determining, by the load balancing node, the first data and the second node based on the first primary key ID, the first transaction ID, the log information transmitted by the second node, and the log information transmitted by the third node.

8. The method according to claim 7, wherein determining the first data and the second node comprises:
determining, by the load balancing node by using the second route assignment table, the first data based on the first primary key ID;
collecting, by the load balancing node, statistics on the log information transmitted by the second node and the log information transmitted by the third node, to obtain that a quantity of times the second node initiates the first transaction is Q and that a quantity of times the third node initiates the first transaction is P, Q and P being integers greater than or equal to 1; and
determining, by the load balancing node, the second node in response to that Q is greater than P, and determining the first data by using the second route assignment table based on the first primary key ID.

9. The method according to claim 1, wherein obtaining the second route assignment table comprises:
obtaining, by the load balancing node, a first primary key ID set, the first primary key ID set comprising a plurality of primary key IDs, and one primary key ID being used for uniquely identifying the first data;
dividing, by the load balancing node, the first primary key ID set into S second primary key ID sets, each primary key ID in the second primary key ID set being managed by a same node, and S being an integer greater than or equal to 1;

assigning, by the load balancing node, the S second primary key IDs to S nodes;

determining, by the load balancing node from the S nodes, the first node managing a third primary key ID set, the third primary key ID set comprising the first primary key ID;

obtaining, by the load balancing node, a partition ID set corresponding to the first node;

determining, by the load balancing node from the partition ID set, the second partition ID corresponding to the first data; and establishing, by the load balancing node, the mapping relationship between the first primary key ID and the second partition ID, and generating the first route assignment table.

10. The method according to claim 1, wherein obtaining the second route assignment table comprises:

obtaining, by the load balancing node, a third route assignment table;

receiving, by the load balancing node, a data addition instruction, the data addition instruction carrying the mapping relationship between the first primary key ID and the second partition ID;

obtaining, by the load balancing node, the mapping relationship between the first primary key ID and the second partition ID according to the data addition instruction; and adding, by the load balancing node, the mapping relationship between the first primary key ID and the second partition ID to the third route assignment table to obtain the first route assignment table.

11. The method according to claim 1, wherein obtaining the second route assignment table comprises:

obtaining, by the load balancing node, a fourth route assignment table, the fourth route assignment table comprising a mapping relationship between a second primary key ID and the first partition ID;

receiving, by the load balancing node, a data deletion instruction, the data deletion instruction carrying the second primary key ID;

obtaining, by the load balancing node, the second primary key ID according to the data deletion instruction; and determining, by the load balancing node from the fourth route assignment table, the mapping relationship between the second primary key ID and the first partition ID based on the second primary key ID; and deleting, by the load balancing node, the mapping relationship between the second primary key ID and the first partition ID in the fourth route assignment table to obtain the second route assignment table.

12. A data migration apparatus of a first node in a load balancing system, the apparatus comprising: a memory storing computer program instructions; and a processor coupled to the memory and configured to execute the computer program instructions and perform:

obtaining a first route assignment table, the first route assignment table including a mapping relationship between a first primary key identity (ID) and a first partition ID, the first primary key ID uniquely identifying first data, and the first partition ID uniquely identifying a second node in the load balancing system;

receiving a first instruction, the first instruction carrying the first primary key ID and a first transaction ID, the first transaction ID indicating a first transaction, and a first node being configured to process the first transaction;

obtaining the first partition ID based on the first primary key ID carried in the first instruction, by using the first route assignment table;

determining the second node based on the first partition ID, the second node being configured to process the first transaction; and transmitting the first data to the second node, wherein the first route assignment table is obtained by:

obtaining, by a load balancing node in the load balancing system, a second route assignment table, the second route assignment table including a mapping relationship between the first primary key ID and a second partition ID, and the second partition ID indicating the first node;

determining, by the load balancing node, the first data and the second node in response to determining that a data migration condition is satisfied, the first data being data desired to be migrated to the second node;

replacing, by the load balancing node, the second partition ID in the second route assignment table with the first partition ID to obtain the first route assignment table; and transmitting, by the load balancing node, the first route assignment table to the first node and the second node.

13. The apparatus according to claim 12, wherein the first route assignment table further includes a mapping relationship between a first index ID and the first partition ID; the first instruction further includes the first index ID; and obtaining the first partition ID includes:

determining, by using the first route assignment table, N partition IDs based on the first index ID carried in the first instruction, the N partition IDs comprising the first partition ID, and N being an integer greater than or equal to 1; and determining, by using the first route assignment table, the first partition ID from the N partition IDs based on the first primary key ID carried in the first instruction.

14. The apparatus according to claim 12, wherein the processor is further configured to execute the computer program instructions and perform:

obtaining the second route assignment table at a first time point;

obtaining the first route assignment table includes: obtaining the first route assignment table at a second time point, the second time point being later than the first time point; and deleting the second route assignment table.

15. The apparatus according to claim 12, wherein the data migration condition is that a ratio of a two-phase commit (2PC) transaction processing throughput to a total transaction processing throughput of a node is greater than a first preset threshold; and determining that the data migration condition is satisfied includes:

obtaining a 2PC transaction ID in response to that log information transmitted by the first node is received in a first preset period, the log information transmitted by the first node comprising the 2PC transaction ID, and the 2PC transaction ID indicating that the log information is generated after the first node processes a 2PC transaction;

obtaining a total transaction processing throughput of the first node based on the log information transmitted by the first node;

obtaining a 2PC transaction processing throughput of the first node based on the 2PC transaction ID; and determining, in response to that a ratio of the 2PC transaction processing throughput of the first node to the total transaction processing throughput of the first node is greater than the first preset threshold, that the data migration condition is satisfied.

16. The apparatus according to claim 12, wherein the data migration condition is that total memory usage of a node is greater than a second preset threshold;

the data migration condition is determined to be satisfied by:

receiving, in a second preset period, total memory usage of the first node transmitted by the first node, the total memory usage indicating a memory resource occupied by a plurality of transactions processed by the first node; and determining, in response to that the total memory usage of the first node is greater than the second preset threshold, that the data migration condition is satisfied.

17. The apparatus according to claim 12, wherein the log information transmitted by the first node further includes the first transaction ID and the first primary key ID, and wherein the processor is further configured to execute the computer program instructions and perform:

receiving log information transmitted by the second node and log information transmitted by the third node, the log information transmitted by the second node comprising the first transaction ID and the first primary key ID, and the log information transmitted by the third node comprising the first transaction ID and the first primary key ID; and the determining the first data and the second node includes:

collecting statistics on the log information transmitted by the first node, the log information transmitted by the second node, and the log information transmitted by the third node, to obtain that a quantity of times the first node initiates the first transaction to the second node is L and that a quantity of times the first node initiates the first transaction to the third node is M, L and M being integers greater than or equal to 1; and determining the second node in response to that L is greater than M, and determining the first data by using the second route assignment table based on the first primary key ID.

18. A non-transitory computer-readable storage medium storing computer program instructions executable by at least one processor of a first node in a load balancing system to perform:

obtaining a first route assignment table, the first route assignment table including a mapping relationship between a first primary key identity (ID) and a first partition ID, the first primary key ID uniquely identifying first data, and the first partition ID uniquely identifying a second node in the load balancing system;

receiving a first instruction, the first instruction carrying the first primary key ID and a first transaction ID, the first transaction ID indicating a first transaction, and a first node being configured to process the first transaction;

obtaining the first partition ID based on the first primary key ID carried in the first instruction, by using the first route assignment table;

determining the second node based on the first partition ID, the second node being configured to process the first transaction; and transmitting the first data to the second node, wherein the first route assignment table is obtained by:

obtaining, by a load balancing node in the load balancing system, a second route assignment table, the second route assignment table including a mapping relationship between the first primary key ID and a second partition ID, and the second partition ID indicating the first node;

determining, by the load balancing node, the first data and the second node in response to determining that a data migration condition is satisfied, the first data being data desired to be migrated to the second node;

replacing, by the load balancing node, the second partition ID in the second route assignment table with the first partition ID to obtain the first route assignment table; and transmitting, by the load balancing node, the first route assignment table to the first node and the second node.

* * * * *